United States Patent
Lang

(10) Patent No.: US 8,695,449 B2
(45) Date of Patent: Apr. 15, 2014

(54) RATTLE-FREE COMPONENT PAIRING

(75) Inventor: Claus-Hermann Lang, Ravensburg (DE)

(73) Assignee: GETRAG Getriebe- und Zhanradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 141 days.

(21) Appl. No.: 12/824,100

(22) Filed: Jun. 25, 2010

(65) Prior Publication Data

US 2010/0326223 A1  Dec. 30, 2010

Related U.S. Application Data

(63) Continuation of application No. PCT/EP2008/010988, filed on Dec. 21, 2008.

(30) Foreign Application Priority Data

Dec. 27, 2007  (DE) .................... 10 2007 063 524
Aug. 7, 2008  (DE) ................ 20 2008 010 745 U

(51) Int. Cl.
*F16H 55/18*  (2006.01)
(52) U.S. Cl.
USPC .............................. 74/409; 74/440
(58) Field of Classification Search
USPC ................................... 74/409, 440
See application file for complete search history.

(56) References Cited

U.S. PATENT DOCUMENTS

| | | | | |
|---|---|---|---|---|
| 1,629,564 A * | 5/1927 | White | | 74/440 |
| 4,519,264 A * | 5/1985 | Inui | | 74/409 |
| 4,881,422 A | 11/1989 | Maguire | | |
| 6,615,683 B1 * | 9/2003 | Voigt | | 74/440 |
| 7,007,565 B2 * | 3/2006 | Allen et al. | | 74/333 |
| 7,383,750 B2 * | 6/2008 | Menjak et al. | | 74/409 |

FOREIGN PATENT DOCUMENTS

| | | |
|---|---|---|
| DE | 274 628 A | 5/1913 |
| DE | 1 967 959 | 9/1967 |
| DE | 37 35 335 A1 | 4/1989 |
| DE | 39 34 377 A1 | 5/1990 |
| DE | 39 34377 A1 | 5/1990 |

(Continued)

OTHER PUBLICATIONS

International Search Report; Application No. PCT/EP2008/010988; Dec. 21, 2008.

(Continued)

*Primary Examiner* — Justin Krause
(74) *Attorney, Agent, or Firm* — Knobbe, Martens, Olson & Bear, LLP

(57) ABSTRACT

A component pairing comprises a first component with a first component toothing and comprises a second component with a second component toothing which is in engagement with the first component toothing in order to be able to transmit a drive force in a drive direction via the component toothings. The first component is also assigned a first anti-rattle toothing. An anti-rattle component is fastened to the second component, which anti-rattle component has a second anti-rattle toothing which is in engagement with the first anti-rattle toothing. The anti-rattle component is mounted so as to be displaceable relative to the second component in the drive direction. The second component and the anti-rattle component are assigned in each case one friction section. The friction sections are in frictional engagement with one another.

8 Claims, 18 Drawing Sheets

(56) References Cited

FOREIGN PATENT DOCUMENTS

| | | | |
|---|---|---|---|
| DE | 38 39 807 C1 | | 6/1990 |
| DE | 43 29 851 A1 | | 3/1994 |
| DE | 197 21 851 A1 | | 12/1998 |
| DE | 199 13 563 C1 | | 6/2000 |
| DE | 103 28 482 A1 | | 1/2004 |
| DE | 10 2004 008 171 A1 | | 9/2005 |
| FR | 2 808 857 | | 11/2001 |
| GB | 1 326 427 | | 8/1973 |
| GB | 2 224 805 A | | 5/1990 |
| GB | 2224805 A | * | 5/1990 |
| GB | 2 411 937 | | 9/2005 |
| JP | 62228735 A | | 10/1987 |
| JP | 63038763 A | | 2/1988 |
| JP | 63312565 A | | 12/1988 |
| JP | 01153865 A | | 6/1989 |
| JP | 09296858 A | | 11/1997 |
| JP | 11153211 | | 6/1999 |
| JP | 11303974 A | | 11/1999 |
| JP | 2002303363 A | | 10/2002 |
| JP | 2003207030 A | | 7/2003 |

OTHER PUBLICATIONS

English translation of International Preliminary Report on Patentability for International Application No. PCT/EP2008/010988, filed Dec. 21, 2008.

* cited by examiner

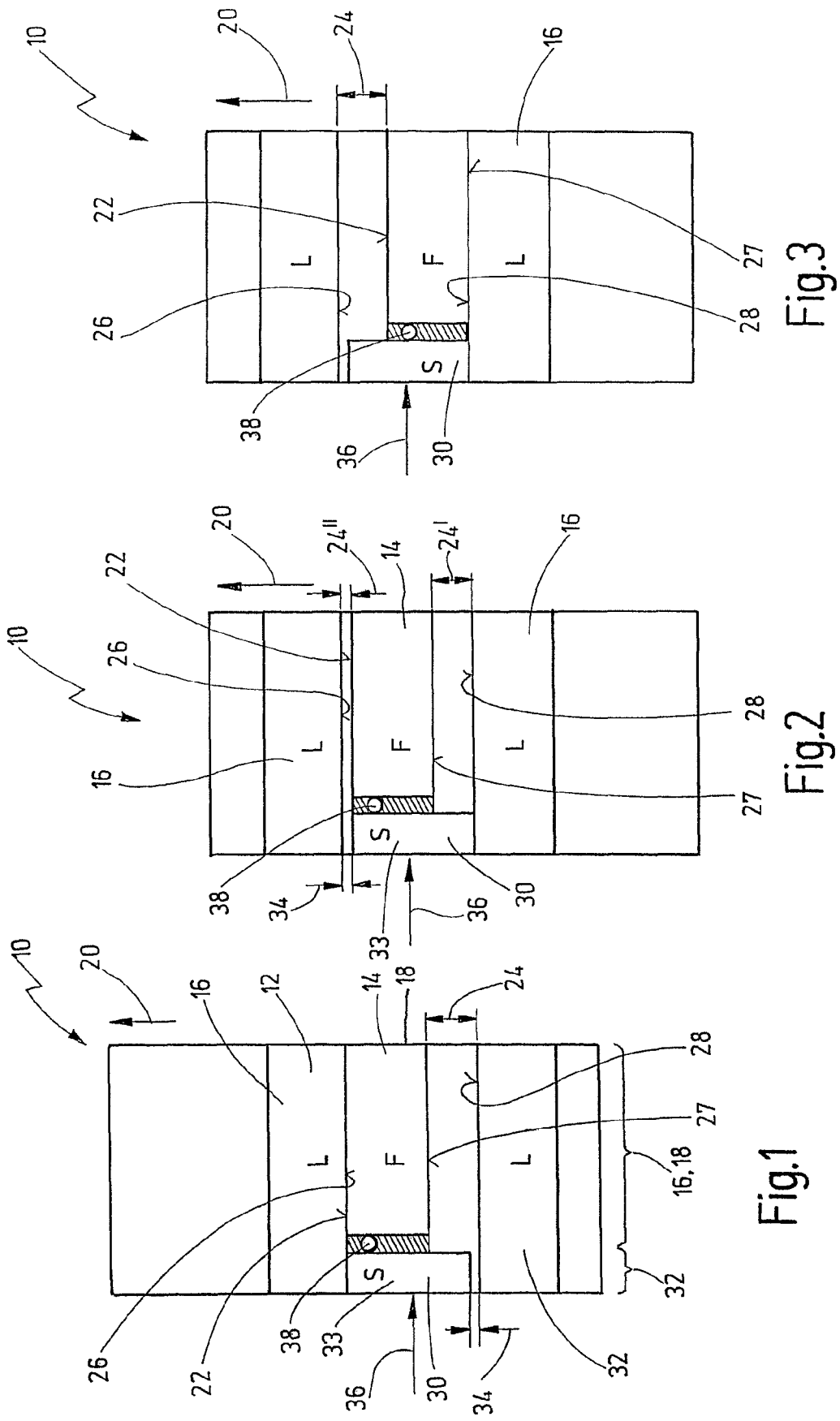

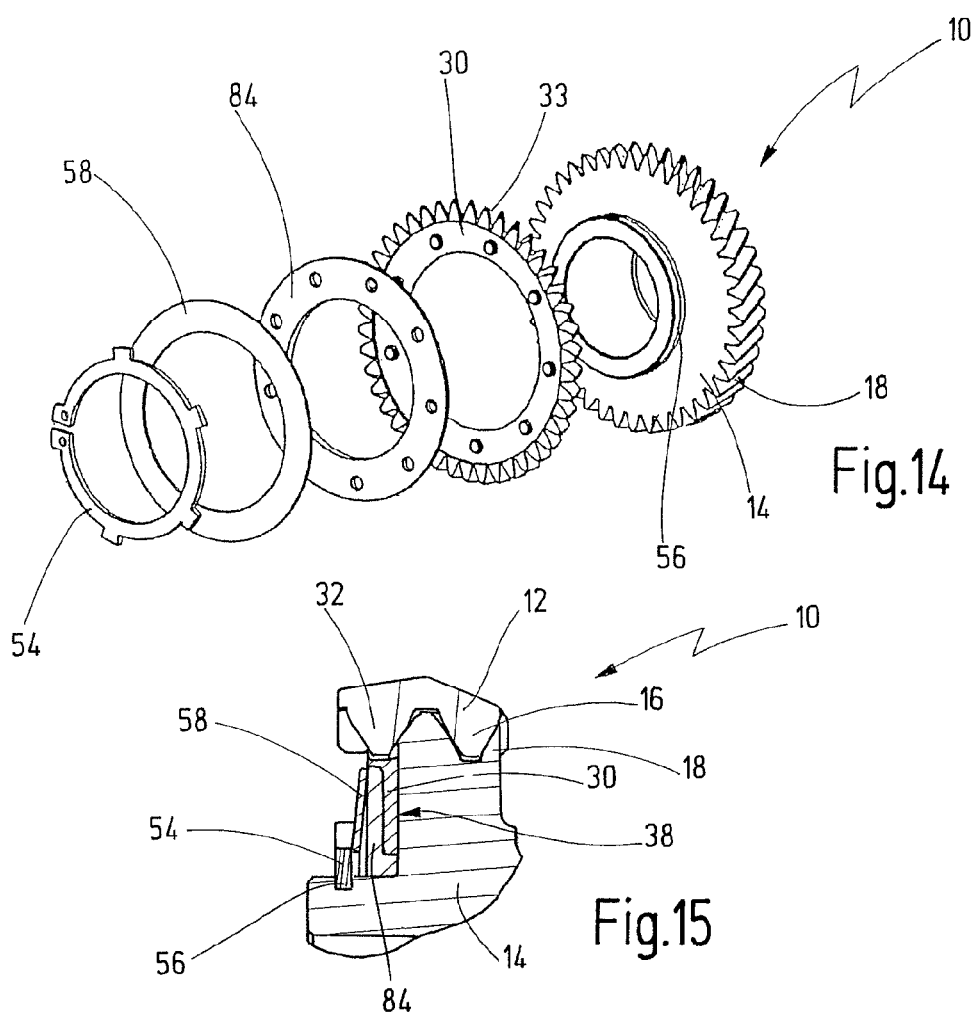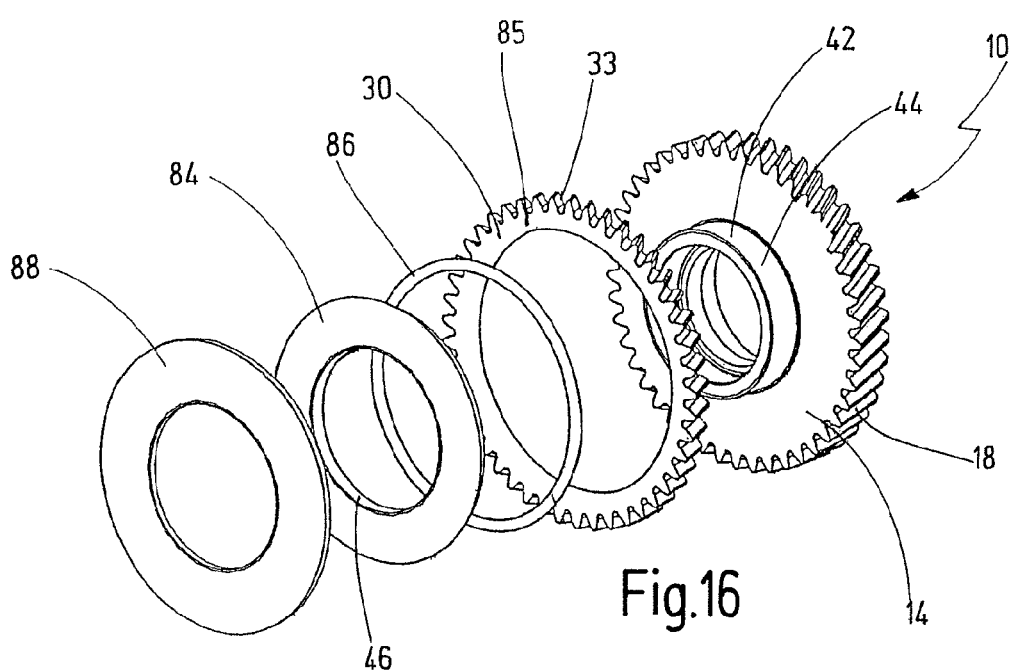

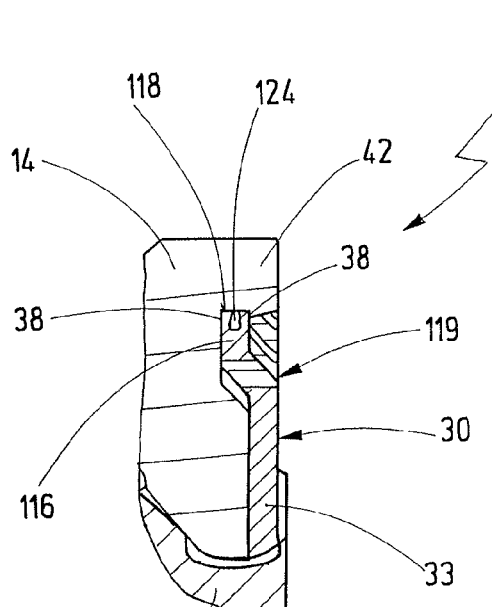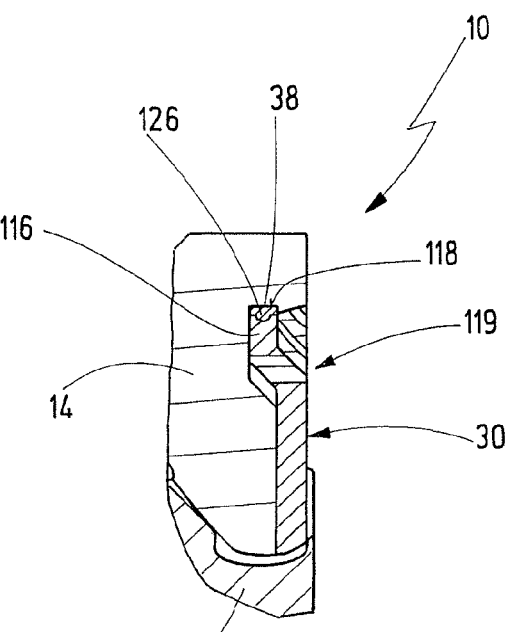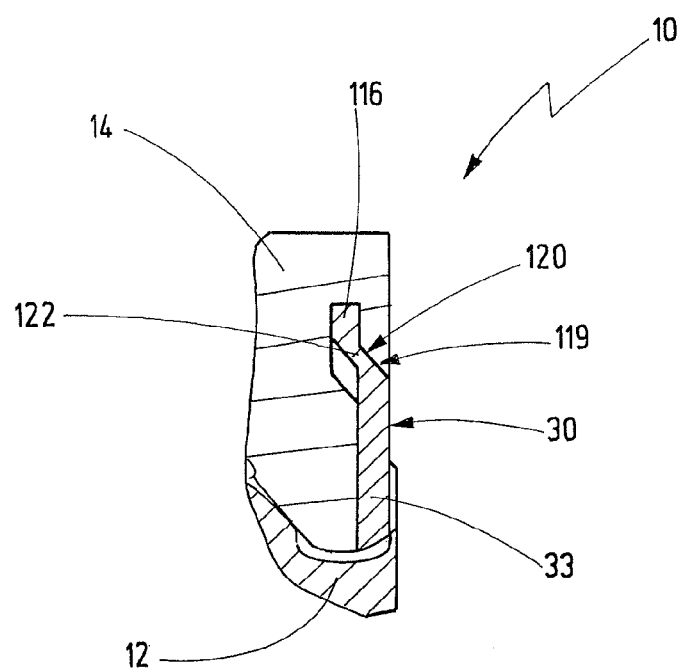

RATTLE-FREE COMPONENT PAIRING

CROSS-REFERENCE TO RELATED APPLICATIONS

This is a continuation application of International patent application PCT/EP2008/010988, filed Dec. 21, 2008, claiming the priorities of German patent application DE 10 2007 063 524, filed Dec. 27, 2007, and of German utility application DE 20 2008 010745, filed Aug. 7, 2008, the entireties of which are incorporated by reference herein.

BACKGROUND OF THE INVENTION

The present invention relates to a mechanical component pairing comprising a first component with a first component toothing and comprising a second component with a second component toothing which is in engagement with the first component toothing in order to be able to transmit a drive force in a drive direction via the component toothings.

Component pairings of said type are generally known, for example in the form of gearwheel pairings and/or the pairing of a toothed rack with a gearwheel. Such component pairings are often used in drivetrains of motor vehicles, for example in multi-stage gearboxes, in drives for auxiliary units etc.

One of the main problems with mechanical component pairings of said type is the so-called rattling phenomenon. This occurs primarily on account of vibration excitation in the drivetrain generated for example by a drive engine, such as an internal combustion engine, of the drivetrain. The rattling (also referred to as undesirable vibrations) is generated in that, on account of the vibration excitation, the driving component is decelerated but the driven component (for example a loose wheel) continues to rotate with an imparted rotational movement and is decelerated only as a result of friction and drag torque effects. Here, the driven component moves away from a traction flank of the driving component, so as to swing towards the thrust flank of the driving component and possibly impact against said thrust flank. Such phenomena occur not only during load shift reactions but rather in particular on account of the higher-frequency excitations from other parts of the drivetrain, such as for example an internal combustion engine.

There are numerous approaches for reducing such noises. Firstly, it is possible for active gearbox-external measures to be implemented which for example decouple the spurious excitation from an internal combustion engine by means of a dual-mass flywheel. Such dual-mass flywheels are however expensive in terms of the installation space taken up, the necessary additional weight and in terms of costs. A further option are passive gearbox-external measures such as for example encapsulation or insulation of the gearbox housing. These measures are also disadvantageous. Also known are active gearbox-internal measures which are purposely arranged at the main noise sources. Such active gearbox-internal measures are often aimed at minimizing functional plays or eliminating mobility within said functional plays. Disadvantages here are often the reduced efficiency and the generation of other undesired noises (such as for example whining). It is also known, for noise reduction, to provide passive gearbox-internal measures which are arranged directly at the noise sources (that is to say for example at the gearwheels) and which absorb or isolate mechanical vibrations.

Known measures here are loose-wheel brakes, measures for tooth space bracing, measures which make use of a disc with a slightly different transmission ratio, measures with a friction wheel secondary transmission ratio, vibration absorbers, magnetic solutions for preventing the tooth flanks from moving apart from one another, etc.

Document DE 103 28 482 A1 discloses, for example, a gear mechanism having an anti-rattle device. Here, a loose wheel and a fixed wheel are assigned in each case one friction wheel, which friction wheels are in frictional engagement with one another.

From document DE 197 21 851 A1, it is known to reduce the tooth flank play in a gearwheel pairing by virtue of a toothed disc with slightly bendable teeth being attached to one gearwheel. The bendable teeth of the toothed disc engage into the counterpart toothing of the gearwheel pairing and are intended to provide noise damping without significant wear to the other gearwheel element.

It is known from DE 38 39 807 C1 to eliminate the tooth flank play between two gearwheels by virtue of an additional toothed disc being provided on one gearwheel and by virtue of the toothed disc being preloaded in the circumferential direction relative to the associated gearwheel by means of springs.

Furthermore, document DE 10 2004 00 A1 discloses a spur gear drive for camshafts in which one gearwheel is of two-part design.

Also known from the prior art (for example DE 1 967 959 A1, JP 62228735 A, U.S. Pat. No. 4,577,525) are anti-rattle measures in which an anti-rattle toothing of an anti-rattle component has one tooth more or fewer than the component toothing of the associated component.

Document JP 01153865 A discloses an arrangement having a component pairing and an associated anti-rattle component, with the anti-rattle toothing of the component with which the anti-rattle component is in engagement having a different helix angle than the component toothing thereof.

BRIEF SUMMARY OF THE INVENTION

Against the above background, it is the object of the invention to specify a mechanical component pairing by means of which an effective noise reduction can be realized and which has a high efficiency.

Said object is achieved, according to a first aspect of the invention, by means of a component pairing comprising a first component with a first component toothing and comprising a second component with a second component toothing which is in engagement with the first component toothing in order to be able to transmit a drive force in a drive direction via the component toothings, with the first component also being assigned a first anti-rattle toothing, with an anti-rattle component being fastened to the second component, which anti-rattle component is mounted so as to be displaceable relative to the second component in the drive direction and has a second anti-rattle toothing which is in engagement with the first anti-rattle toothing, and with the second component and the anti-rattle component being assigned in each case one friction section, which friction sections are in frictional engagement with one another.

The component pairing may be a gearwheel pairing. In this case, the drive direction is a drive direction aligned in the circumferential direction of the driving gearwheel. In this case, a component may be regarded as being a split wheel, with one part being responsible for transmitting load and with it being possible for the other part (anti-rattle component) to serve for damping spurious excitations and/or ensuring freedom from play. The component pairing may however also be a combination of a toothed rack and a gearwheel, with the drive direction running substantially linearly.

Since the second component and the anti-rattle component are in frictional engagement with one another, the anti-rattle component is driven by the second component in the steady state without efficiency-reducing bracing effects occurring. In the event of vibration excitation, it is possible, proceeding from the steady state, for the traction flank (which may also be referred to as front flank or working flank) of the driving component to move away from a thrust flank (which may also be referred to as rear flank or non-working flank) of the driven component, and even turn over as far as the opposite flank (on account of the tooth flank play generally present between the component toothings). Here, the relative movement between the two components is decelerated, or dampened, by means of the anti-rattle component or the frictional engagement between the anti-rattle component and the second component.

Furthermore, the component pairing according to the invention acts in both drive directions (that is to say for example in both rotational directions in the case of gearwheels). Furthermore, the component pairing according to the invention may be used both in straight-toothed and also in helically toothed component toothings.

With regard to tooth shapes, the anti-rattle toothings may be of identical or similar construction to the component toothings (for example as involute toothings). The anti-rattle toothings may however also have any other desired shape, with it being preferable for the anti-rattle toothings to engage on one another in a punctiform or linear manner. It is particularly preferable for the anti-rattle toothings to be in engagement with one another in a punctiform or linear manner at the level of the pitch circle.

Here, the tooth flank or circumferential play between the anti-rattle toothings is preferably smaller than the tooth flank or circumferential play between the component toothings. If the tooth flank play between the anti-rattle toothings is greater than zero, it may be obtained in this way that firstly the second anti-rattle toothing turns over (on account of the smaller tooth flank play) in the event of a deceleration of the driving component. During the further course of the movement of the driving component in the direction of the counterpart flank, said movement is then decelerated on account of the frictional engagement between the second component and the anti-rattle component. It may be obtained in this way that, as the second component turns over, it does not turn over as far as the first component or it turns over as far as the first component only with a lower relative speed. Here, since the anti-rattle toothings are not constantly in engagement with one another or preferably not braced against one another in normal operation, that is to say for example under traction or overrun conditions, the anti-rattle measures according to the present invention also do not generate any secondary tonal noise, such as for example whining.

The tooth flank play between the anti-rattle toothings may however also be zero, such that two-flank rolling contact is obtained.

In the component pairing according to the invention, it is generally irrelevant whether the first or the second component is the driving component. The anti-rattle component is however connected to a fixed wheel (that is to say a gearwheel which is fixedly connected to a rotary shaft), since the loose wheel which is in engagement with said fixed wheel is often installed using shift clutches (synchronizers etc.), such that the anti-rattle component cannot be attached there or can be attached there only with a relatively high level of expenditure.

It is also self-evident that a component such as a gearwheel may also be assigned two or more anti-rattle components, for example on axially opposite sides of the gearwheel. This is particularly preferable if the second component is in engagement with more than one first component. Here, each anti-rattle component may be designed specifically for meshing with one first component.

With regard to terminology, the following should be noted. If any toothing drives another toothing, either without load or so as to transmit power, then said toothing pulls the driven toothing, by means of the traction flank of the driving toothing on the traction flank of the driven toothing, in the direction of the present drive or rotational direction. If the points of flank contact turn over—such as is the case during rattling or traction/overrun load shift reactions—then the rear flanks of said gearwheels come into engagement. This terminology changes when the direction of rotation or the drive or rotational direction of said toothing pairing changes.

Within the context of the present application, the traction flank of the driving toothing is also referred to as the thrust flank, and the traction flank of the driven toothing is also referred to as the rear flank. Likewise, within the context of the present application, the rear flanks which are not in engagement are likewise referred to as thrust flank and rear flank.

Furthermore, the number of teeth and/or the tooth pitch (module) of the component toothings and of the respectively assigned anti-rattle toothings are preferably identical. In contrast to anti-rattle measures in which for example the anti-rattle toothing of the anti-rattle component has one tooth more or fewer than the associated component toothing, constant bracing and associated efficiency losses are avoided on account of the identical number of teeth or tooth pitch. If appropriate, however, the anti-rattle toothing may have the same pitch but fewer teeth than the associated component toothing, by virtue of only each second, third, fourth (generally n-th) component tooth being assigned an anti-rattle tooth, specifically in particular as a function of the frequency range of the spurious excitation; an adequate overlap ratio should be provided.

It is also preferable for the component toothing and the respectively associated anti-rattle toothings to be substantially identical with regard to other toothing properties, for example with regard to the toothing type (for example involute toothing), the helix angle, the tip circle diameter, the pitch circle diameter, the engagement angle, etc.

The above object is also achieved by means of a gearbox having a component pairing of said type, in particular a motor vehicle gearbox, and by means of a drivetrain having a gearbox of said type.

If the motor vehicle gearbox is designed as a countershaft-type multi-stage gearbox, one or more wheel sets (in each case with one loose wheel and at least one fixed wheel) may have a component pairing according to the invention. The tendency of such gearboxes to rattle may be reduced by means of the measures according to the invention to such an extent that the multi-stage gearbox can be designed without a dual-mass flywheel. This leads to a considerable increase in efficiency because the overall mass, or the so-called mass factor, can be reduced. The considerable costs for a dual-mass flywheel can also be saved in this way. Furthermore, the disturbing tendency for vibration build-up in a dual-mass flywheel can be reduced. Furthermore, as a result of the reduction in the rotating masses to be accelerated, better response behaviour can be obtained (the vehicle equipped in this way "responds better to the throttle"). Here, a drivetrain having a multi-stage gearbox of said type may have an adapted starting clutch which has an integrated torsional damper (torsion-damped clutch disc). The multi-stage gearbox may be a manual, an automatic or a dual-clutch gearbox.

If the gearbox is designed as a converter gearbox, at least one of the planetary gear sets may have a component pairing according to the invention. The resulting reduced rattling tendency may be utilized to close a lock-up clutch, which bypasses the hydrodynamic converter, more frequently (earlier). Efficiency can be increased in this way.

The object is thereby achieved in its entirety.

The friction sections are preferably formed in a plane parallel to the drive direction.

In this way, the frictional engagement can take place effectively, while the second component and the anti-rattle component are offset with respect to one another in the drive direction.

In a preferred gearwheel pairing, the friction sections may consequently extend in the circumferential direction. In the case of a toothed rack being used, the friction sections may extend linearly.

It is particularly preferable for the friction sections to be aligned radially, that is to say in particular perpendicular to the extent of an individual tooth of the component toothings.

In this way, the second component and the anti-rattle component can be produced cost-effectively. Furthermore, in the case of helical toothings, the axial force acting during the toothed engagement of the component toothings can be used to exert pressure, that is to say to press the anti-rattle component and the second component into frictional engagement.

Here, in a further preferred embodiment, the friction sections are formed in the region of lateral end faces of the second component and of the anti-rattle component.

In this way, the friction sections can be produced cost-effectively.

In a further preferred embodiment, the friction sections are of oblique or conical shape.

In this way, a high friction action can be obtained with relatively low forces, as is the case in synchronizers for manual gearboxes.

It is also advantageous for one friction section to be formed directly on the second component.

In this way, the number of parts of the component pairing can be reduced.

In a further preferred embodiment, one friction section is formed directly on the anti-rattle component.

In this embodiment, too, the number of parts can be reduced.

It is likewise advantageous overall if guide means for guiding the anti-rattle component in the drive direction are formed on the second component.

In this way, the offset of the anti-rattle component in relation to the second component can take place in a controlled fashion in the drive direction.

In a further preferred embodiment, an axially projecting annular projection is formed on the second component, which annular projection faces towards the anti-rattle component.

The annular projection may for example be used as a guide means for guiding the anti-rattle component in the drive direction. The annular projection may however also have further functions.

It is also advantageous if the anti-rattle component is arranged laterally adjacent to the second component.

This simplifies the construction, wherein an arrangement laterally adjacent to the second component should also be understood to mean that the anti-rattle component is guided on an axially projecting annular projection of the second component. It is however particularly preferable here for the anti-rattle toothings to be arranged laterally adjacent to the component toothings.

It is advantageous overall if the anti-rattle component is produced from plastic.

As plastic, it is for example possible to use polyamide which has high strength and stiffness and very good chemical resistance. Polyamide also has high resistance to wear and good sliding properties.

The mechanical properties may be adapted by means of fibre composites with glass or carbon fibres, in particular in order to reduce water absorption.

Polyolefin-based additives are preferably added in order to ensure high impact resistance.

Furthermore, the anti-rattle component may be produced from plastic cost-effectively. It is also possible for the anti-rattle component to be produced from plastic with relatively high precision, such that the tooth flank play between the anti-rattle toothings may be smaller than the tooth flank play between the component toothings.

It is therefore preferable for the anti-rattle component to be produced with greater precision than the second component.

In a further preferred embodiment, the second anti-rattle toothing and/or the first anti-rattle toothing have teeth which are elastically deformable in the drive direction.

In this way, noises which occur when the anti-rattle toothings turn over can be dampened.

It is also preferable for the second anti-rattle toothing to have teeth which are formed with radial slots proceeding from the tooth tip.

In this way, the elastic deformability can be increased even with relatively stiff plastics (or other materials of the anti-rattle component).

In one preferred embodiment, the first anti-rattle toothing is formed on the first component.

The number of parts can be reduced in this way.

Here, it is preferable for the first anti-rattle toothing to be aligned with the first component toothing, in particular in the axial direction. In other words, it is possible here for teeth of the first component toothing to be aligned with teeth of the first anti-rattle toothing.

It is also advantageous for the first anti-rattle toothing to be part of the first component toothing.

In said embodiment, the first component toothing is generally designed to be wider than the second component toothing, with the axially projecting part of the first component toothing forming the first anti-rattle toothing.

In this way, the first component can be produced cost-effectively.

In an alternative embodiment, the first anti-rattle toothing is formed on a counterpart component which is rigidly fixed to the first component.

In said embodiment, the anti-rattle toothings may be ideally matched to one another in terms of geometry and/or material selection.

Here, it is particularly advantageous if the counterpart component is arranged laterally adjacent to the first component.

It is also advantageous overall if the second component and the anti-rattle component are braced elastically against one another, in particular in the axial direction, in order to press the friction sections against one another.

It can be ensured in this way that a sufficient friction force for decelerating the turnover of the component toothings is always available even over a relatively long service life.

In a first embodiment, it is preferable here for a circlip to be arranged between the second component and the anti-rattle component, which circlip is supported on a conically tapering surface.

In this way, the circlip can press the second component and the anti-rattle component elastically against one another, in particular in the axial direction, by means of the action of the conically tapering surface.

It is also preferable here for the conically tapering surface to be formed on a further annular projection of the second component. It is however generally also conceivable for the conically tapering surface to be formed on a first annular projection on which the anti-rattle component is guided.

If the further annular projection is used, it is preferable for said further annular projection to be arranged radially outside the first annular projection (which serves for guidance purposes).

It is also advantageous here for the further annular projection to have a conically undercut radial groove on which the circlip is supported.

In said embodiment, the component pairing according to the invention can be constructed using very few components. Said embodiment also provides easy assembly and also comparatively easy disassembly of the component pairing.

In a further embodiment, the anti-rattle component is pressed against the second component by means of an annular plate spring which is supported on a radial projection of the second component, in particular on a spring ring.

Here, it is preferable for the spring ring to be fixed in a radial groove on an annular projection of the second component. This can provide very easy assembly and disassembly.

In a further embodiment, at least one friction element is arranged between the second component and the anti-rattle component.

In said embodiment, at least one friction section is formed not on the second component or on the anti-rattle component but rather on the friction element, which in turn is fixed to the second component or to the anti-rattle component.

In this way, it is possible to select a friction element with a material which is optimized for the purpose of the present application.

Here, it is particularly advantageous for the at least one friction element to be elastically deformable.

In said embodiment, it is possible to obtain the deceleration action according to the invention during the turn-over of the component toothings even over a relatively long service life.

In said embodiment, it is likewise preferable for the second component and the anti-rattle component to be pressed towards one another counter to the resistance of the at least one friction element.

A desired friction action can be set in an effective manner in this way.

The anti-rattle mechanism of the component pairing according to the invention is not a gearing in the mechanical engineering sense but rather a support mechanism for retarding or decelerating or damping the toothings which would otherwise oscillate back and forth within the rotational flank play. The anti-rattle measure is distinguished by high efficiency, since the mechanism acts only during the back and forth oscillation (turn-over) of the toothings, whereas only internal forces act between the anti-rattle component and the second component otherwise. Since the anti-rattle component can be designed to be relatively narrow (for example in the range from 0.5 to 8 mm, in particular from 1 to 5 mm), there are also no resulting significantly increased splashing losses.

The anti-rattle mechanism can be provided with a low weight and at low cost. Secondary noises such as whining are not generated. During load shift impacts (that is to say low-frequency turn-over), the anti-rattle mechanism is pushed over. Since it is the case here too that the mechanism comes into effect only during the turn-over phase, this results does not result in any impairment in efficiency.

In contrast to measures in the prior art, the anti-rattle component and the second component are movable relative to one another in the drive direction. Since the anti-rattle component and the second component are operatively connected by means of the frictional engagement, it is consequently possible for the free-flight phase of the component toothings during the turn-over to be minimized, in particular if the tooth flank play between the anti-rattle toothings is smaller than the tooth flank play between the component toothings.

The first and the second anti-rattle toothing come into positively locking engagement with one another, like toothings. The toothings however generally need not be involute toothings like the component toothings. In fact, the contour of the teeth of the anti-rattle toothings may be spherical or convex in profile. The teeth of the anti-rattle toothings ideally make contact at a point or in a line. Here, any profile pairings (convex-convex, planar-convex or convex-planar) are conceivable.

In a further preferred embodiment, the anti-rattle component is connected to a complementary anti-rattle component which has a complementary anti-rattle toothing, in such a way that the anti-rattle component can engage on first flanks of the first anti-rattle toothing and the complementary anti-rattle component can engage on second flanks of the first anti-rattle toothing.

Said embodiment is considered to be an independent invention, irrespective of whether the anti-rattle component or the complementary anti-rattle component is mounted so as to be displaceable relative to the second component in the drive direction, and irrespective of whether the second component and the anti-rattle component or the complementary anti-rattle component is assigned in each case one friction section, which friction sections are in frictional engagement with one another.

The anti-rattle component and the complementary anti-rattle component together form a type of scissors arrangement, such that said component can also be referred to as scissors-type components.

Here, the anti-rattle component may be optimized for making contact with the first flanks and the complementary anti-rattle component may be optimized for making contact with the second flanks of the first anti-rattle toothing.

The complementary anti-rattle toothing and the second anti-rattle toothing (of the anti-rattle component) preferably have an identical toothing. Here, in a normal state, the anti-rattle toothings of the anti-rattle component and of the complementary anti-rattle component are offset slightly with respect to one another preferably in the drive direction.

Here, it is particularly preferable for the anti-rattle component and the complementary anti-rattle component to be braced elastically against one another in the drive direction. In said embodiment, the anti-rattle toothing of the anti-rattle component is pressed by the elastic bracing action against the first flanks of the first anti-rattle toothing. The complementary anti-rattle toothing of the complementary anti-rattle component is pressed by said elastic bracing action against the second flanks of the first anti-rattle toothing. Vibration excitation can be effectively dampened in this way.

It is particularly preferable if the anti-rattle component and the complementary anti-rattle component are arranged coaxially with respect to one another, in particular axially adjacent to one another. Here, it is preferable for the anti-rattle component to be in frictional engagement with the second component. In contrast, the complementary anti-rattle component is preferably not in frictional engagement with the second component, even though this may constitute a feasible variant. Here, the complementary anti-rattle component is arranged in the axial direction between the anti-rattle component and the second component.

To realize the elastic bracing action, it is preferable for the anti-rattle component and the complementary anti-rattle component to have, on their end sides which face towards one another, in each case at least one axial pocket for receiving a spring element.

Here, the spring element acts in the drive direction. Preferably, a multiplicity of such axial pockets and spring elements are provided, which are arranged distributed in the drive direction.

In said embodiment, all production-related tolerances and thermal deformations which have an effect on the rotational flank plays are compensated by up to 100%. Two-flank rolling contact is provided. The forces for compressing the means for elastically bracing the anti-rattle components (which occur during movements of the component toothings within the admissible tooth flank play) can be returned to the system during the subsequent decompression. This results in a high efficiency.

The two-flank rolling contact has the further advantage that the elastic bracing of the anti-rattle components takes place in a plane which is independent of the second component. Accordingly, it is possible to prevent the anti-rattle component and the second component being arranged obliquely with respect to their rotational axis on account of the degrees of freedom present in the radial and axial play. It may consequently be provided that the anti-rattle components and also the second component are in an ideally non-oblique position relative to the first component. Whining, such as would occur for example if the anti-rattle component were braced against a mother gearwheel (as is known in the prior art), is hereby effectively prevented.

In an alternative embodiment, the anti-rattle component and the complementary anti-rattle component are fixedly connected to one another in the drive direction.

The number of components can be considerably reduced in this way.

The anti-rattle component and the complementary anti-rattle component then together form an anti-rattle component as has been described in the introduction with regard to the first aspect of the present invention.

Here, it is particularly advantageous for the second anti-rattle toothing of the anti-rattle component to be formed by spring elements, which are elastically deformable in the drive direction, for contact against the first flanks of the first anti-rattle toothing, and if the complementary anti-rattle toothing of the complementary anti-rattle component is formed by spring elements, which are elastically deformable in the drive direction, for contact against the second flanks of the first anti-rattle toothing.

In said embodiment, it is possible to obtain play compensation of the component toothings by up to 100%.

In said embodiment, too, two-flank rolling contact is provided. The forces which are introduced into the spring elements of the anti-rattle components during relative movements within the tooth flank play of the component toothings are returned to the system during the elastic recovery, so as to provide a high efficiency. Here, the anti-rattle component and the complementary anti-rattle component can be mounted so as to be displaceable relative to the second component in the drive direction, with it being possible for a friction section for frictional engagement with a corresponding friction section of the second component to be formed on the anti-rattle component and/or on the complementary anti-rattle component. A back and forth oscillation of the toothings of the loose wheel within the rotational flank play of the driving fixed wheel (or vice versa) may be prevented in this way.

Here, the spring elements of the anti-rattle components are themselves designed as springs, such that spring elements which act in the drive direction are not required.

The anti-rattle components may be pre-assembled with one another. Furthermore, they can be coupled to one another in the drive direction by means of integrally cast pins in one of the anti-rattle components.

In said embodiment, too, the two-flank rolling contact prevents an oblique position of the anti-rattle components and/or of the second component in relation to the first component.

The anti-rattle component and the complementary anti-rattle component may be produced from plastic such as polyamide, polyimide, etc., or else from metal. In the variant with elastic bracing, the anti-rattle components may be produced for example from 20 $MoCrS_4$, from 18CrNiMo, from 20NiCrMo, etc.

In the variant in which the anti-rattle components have spring elements, at least one of the anti-rattle components is produced preferably from spring steel, if they are not both formed from plastic.

It is particularly advantageous here for the spring elements and the complementary spring elements to be formed in each case as half teeth which complement one another in each case to form one tooth. That is to say, in axial projection, the spring elements and the complementary spring elements can appear as one tooth. The toothing formed from said "teeth" can have a smaller tooth flank play with the anti-rattle toothing of the first component than the tooth flank play of the associated component toothings. It is however alternatively and preferably also possible for said toothing to be designed such that tooth flank play is no longer present in relation to the anti-rattle toothing of the first component.

It is also preferable for the half teeth to have a recess in the region of their tooth root.

The elasticity of the spring elements in the drive direction can be influenced by a recess of said type, which may for example be semi-circular. This is particularly applicable if metal is used as the starting material for the anti-rattle components or spring elements.

According to a second aspect of the present invention, the above object is achieved by means of a component pairing comprising a first component with a first component toothing and comprising a second component with a second component toothing which is in engagement with the first component toothing in order to be able to transmit a drive force in a drive direction via the component toothings, with the first component also being assigned a first anti-rattle toothing and with the second component having fastened to it an anti-rattle component which is elastically deformable, or elastically mounted, in the radial direction (that is to say substantially perpendicular to the drive direction).

The component pairings according to the second aspect of the invention may be combined with the features of the component pairings of the first aspect of the invention unless mentioned otherwise here.

The central concept of the second aspect of the invention is that of being able to compensate the greatest occurring rotational flank play of the component toothings by means of the radial deformability of the anti-rattle component, since the anti-rattle component can consequently deflect radially in an elastic fashion in the region of toothed engagement. In other words, the toothed engagement between the anti-rattle toothings takes place in such a way that a force acts between the anti-rattle component and the second component in the drive direction, which force is such that, even at high-frequency excitations (such as for example from an internal combustion engine, in particular diesel engine), the component toothings do not turn over within the tooth flank play in such a way that a rattling noise is generated. In other words, by means of the anti-rattle toothings, a drag torque, in particular a friction torque, in the circumferential direction can be generated which dampens the spurious excitations. Here, the drag torque should be suitable for reducing, in particular eliminating, the oscillating mass forces.

In said embodiment, too, all production-related tolerances and also thermal deformations which have an effect on the rotational flank plays can be compensated by up to 100%.

Here, the anti-rattle component itself may be elastically deformable, such that it can deflect radially in an elastic fashion in the region of the toothed engagement. Alternatively or in addition to this, the anti-rattle component may be mounted elastically in the radial direction. In said embodiment, on account of the radial elastic deflection in the region of the toothed engagement, a central point of the anti-rattle component may be arranged offset eccentrically with respect to a central point of the second component. Here, it is possible in other words for any desired point of the anti-rattle component to perform a circular movement about the central point of the second component.

The forces which lead to a radial deformation of the anti-rattle component can be returned to the system upon departure from the toothed engagement.

It is particularly preferable for the anti-rattle component to be arranged or designed such that, in the region of toothed engagement with the first anti-rattle toothing, said anti-rattle component is pushed away from the first component in the radial direction, that is to say deflects radially in an elastic fashion in the region of the toothed engagement.

Here, the anti-rattle component is generally preloaded in the direction of the first component, such that the radial deflection takes place counter to the preload. At any rate a radial deflection of the anti-rattle component generally takes place in the region of the toothed engagement.

If the anti-rattle component and the second component are connected to one another by means of a frictional engagement, the friction force can be increased by said deflection, such that relative movements between the second component and the anti-rattle component in the drive direction can be dampened to a greater extent on account of the frictional engagement. In this way, a turn-over of the component toothings, and consequently a rattling or clattering, can be prevented.

However, the radial deflectability of the anti-rattle component relative to the second component to which the anti-rattle component is fastened permits not only an increase in the friction forces. It is also possible for jamming effects during two-flank rolling engagement to be reduced and preferably eliminated.

Since the anti-rattle component is pushed away radially with a relatively low force, the loss in efficiency is substantially negligible. Furthermore, the forces required for the radial deflection can be at least partially returned upon departure from the toothed engagement.

In a further preferred embodiment, the anti-rattle component is arranged or designed such that permanent two-flank rolling engagement is provided between the first and second anti-rattle toothings.

In other words, the first and second anti-rattle toothings are in rolling engagement such that for example at least one tooth of the second anti-rattle toothing is always in contact with the two opposite flanks of a tooth space of the first anti-rattle toothing. Although it is generally also conceivable for the anti-rattle toothings to be coordinated with one another such that a certain tooth flank play is present between them (as is also generally provided in the case of the component toothing), the tooth flank play of the anti-rattle toothings is in this case however preferably smaller than the tooth flank play of the component toothings.

As a result of the two-flank rolling engagement, it is also possible for relative movements of the components in the drive direction to be dampened in both rotational directions.

In general, the two-flank rolling engagement may be realized in any desired manner, for example by means of a positive profile displacement and/or by virtue of the second anti-rattle toothing having a greater pitch circle diameter than the associated second component toothing.

It is however particularly preferable for the teeth of one of the anti-rattle toothings to have a tooth thickness which is greater than or equal to the tooth space of the teeth of the other anti-rattle toothing.

In other words, the two-flank rolling engagement is realized in that the tooth flank play between the anti-rattle toothings is formed so as to be zero or negative. If the tooth thickness is greater than the tooth space, then the anti-rattle component is pushed away in the radial direction in the region of the toothed engagement of the anti-rattle components, specifically away from the first component or in the direction of the second component.

As mentioned above, a friction force between the anti-rattle component and the second component in the drive direction can be increased in this way. Jamming can also be prevented in this way.

It is also preferable for the tooth thickness of the teeth of one of the anti-rattle toothings to be greater by 20 µm to 500 µm, in particular by 50 µm to 250 µm, than the tooth thickness of the teeth of the associated component, and/or by means of a corresponding profile displacement.

Said embodiment is particularly advantageous if the first anti-rattle toothing is formed by the first component toothing. As a result of said tooth thickness dimension, it is possible for example for the tooth thickness of the second anti-rattle toothing to be greater than the greatest tooth space of the first anti-rattle toothing, specifically in all operating states and under all boundary conditions (functional or production-related tolerances and in the event of any thermal and/or mechanical deformation of the components).

It is also particularly preferable if the radial deflection of the anti-rattle component in the region of the toothed engagement with the first anti-rattle toothing is smaller than 500 µm, in particular smaller than 250 µm, preferably smaller than 150 µm.

By dimensioning the anti-rattle toothings such that only such a small radial deflection is obtained, the efficiency of the anti-rattle measure can be very high, even if the forces introduced into the anti-rattle component in this way are sufficient to reduce and preferably prevent rattling or clattering of the component toothings.

In a further preferred embodiment, a spring rate with which the anti-rattle component is preloaded in the radial direction or can be deflected in the radial direction lies in the range from 2 to 100 N/mm, in particular in the range from 5 to 20 N/mm.

It has been found that such spring rates can firstly reduce jamming effects, and secondly, the efficiency of the anti-rattle measure can be high.

On the other hand, the desired damping property for preventing rattling of the component toothing can be reliably obtained.

The above dimensions relating to the tooth thickness, the radial deflection and the spring rate relate to a conventional motor vehicle gearbox for passenger motor vehicles, in particular to an axis spacing of the component-carrying shafts in the range from 60 to 90 mm and/or to a maximum torque which can be transmitted by the gearbox of 150 Nm to 300 Nm. Said values must be adapted correspondingly for smaller or larger component pairings.

It is particularly advantageous here for a radial spring element to be arranged between the anti-rattle component and the second component, by means of which radial spring element the anti-rattle component is preloaded towards the first component in the radial direction.

In this way, the rotational flank play of the component toothings can be compensated by up to 100%, since the anti-rattle component can be pressed radially into the first anti-rattle toothing of the first component such that a tooth of the second anti-rattle toothing is in engagement with the opposite flanks of teeth of the first anti-rattle toothing.

The radial spring element may be designed as an annular corrugated spring element, though may also be designed as a "coil" spring or as a rubber spring.

Here, the radial spring element may also perform the function of providing the frictional engagement between the anti-rattle component and the second component if the first aspect of the present invention is also realized.

The radial spring element preferably has an oblique section by means of which a force also acts on the anti-rattle component in the axial direction.

As a result of said measure, the anti-rattle component can firstly be fixed to the second component in the axial direction indirectly (via the radial spring element). Secondly, in addition to the preload in the radial direction, the anti-rattle component can also have imparted to it a preload in the axial direction. Frictional engagement between the anti-rattle component and the second component, in particular between a friction surface of the second component, which is aligned radially or obliquely, and a corresponding friction surface of the anti-rattle component, can be generated or assisted in this way.

In a further preferred embodiment, the radial spring element has a radially elastic curved section which is inserted into a radial groove of the anti-rattle component.

As a result of said measure, the radial spring element itself can be fixed to the second component in the axial direction. Furthermore, the radial spring element can be supported on the second component in the region of the radial groove in order to exert an elastic preload on the anti-rattle component in the radial and/or axial direction.

Here, it is preferable for the radial spring element to be produced as an annular spring composed of an elastically deformable material such as spring steel.

If spring steel is used for the radial spring element, the component pairing can reliably generate an anti-rattle action over wide temperature ranges (in particular also at very low or very high temperatures, as are common in a motor vehicle).

Here, the dimensions of the spring ring may be similar to those of an O-ring, with the spring ring being preferably hollow in the region between the oblique section and the curved section.

Furthermore, the spring ring may be closed in the circumferential direction, but said spring ring is preferably interrupted in the circumferential direction at one point, in particular in order to facilitate the mounting in the radial groove of the second component.

A radial spring element composed of steel also has the advantage of better lubricant compatibility than, for example, O-rings. The same applies with regard to ageing resistance.

In a further embodiment, the anti-rattle component has a radial spring section and is supported radially on the second component, such that the anti-rattle component is preloaded towards the first component in the radial direction.

Here, the function of the radial spring element is substantially the same as that of the separate radial spring element. The two embodiments may also be combined with one another.

If the anti-rattle component is formed with a radial spring section, however, the number of parts of the component pairing can be reduced.

It is particularly preferable here if the radial spring section has a corrugated spring section arranged radially within the anti-rattle toothing.

Said corrugated spring section may be of substantially identical design to a separate annular corrugated spring element, but in this embodiment is advantageously formed directly onto and in one piece with the anti-rattle component.

In a further preferred embodiment, the radial spring section has a section which is arranged radially within the anti-rattle toothing and which is curved in longitudinal section.

The radial elasticity of the radial spring section can be realized by means of the curved shape of the radial spring section. Furthermore, the curved section may be used for support in the radial direction on the second component. Finally, the curved section may also be used for engaging into a radial groove of the second component in order to fix the anti-rattle component in the axial direction to the second component.

The anti-rattle component can therefore ideally be added as a single additional component to the component pairing, such that the overall number of parts is considerably reduced.

In a further preferred embodiment, the radial spring section has a section which is cranked in longitudinal section.

In said embodiment, the anti-rattle component consequently has an approximately radially aligned section having the anti-rattle toothing and also has, on the opposite side of the cranked section, a further approximately radially aligned section which is supported on the second component.

Said further section and the section having the anti-rattle toothing are offset with respect to one another in the axial direction. The elastic deformability of the anti-rattle component in the radial direction may be realized by means of the interposed cranked section.

It is particularly preferable overall for the anti-rattle component to have a radially inner mounting section by means of which the anti-rattle component is fixed in the axial direction to the second component.

In this way, it is possible if appropriate to dispense with separate fastening means for axial fixing.

It is also possible for the radial inner mounting section to serve for supporting the anti-rattle component in the radial direction on the second component.

It is also advantageous here for the anti-rattle component to be mounted so as to be displaceable relative to the second component in the drive direction and for the second component and the mounting section to be assigned in each case one friction section, which friction sections are in frictional engagement with one another.

In said embodiment, the first and second aspects of the invention can be combined with one another in a structurally expedient manner with little component expenditure.

It is particularly advantageous here for the mounting section to have a friction lining.

The friction force between the mounting section and the second component can be increased in this way.

The friction lining may be provided on an axial side, which is situated opposite an axial surface of the second component, of the mounting section.

It is however particularly preferable for the friction lining to be formed radially at the inside.

In a further preferred embodiment, the mounting section is elastically deformable in the axial direction and is clamped axially into a clamping section of the second component.

The mounting section may for example have a radial groove and be inserted into a radial groove in which it is clamped in the axial direction.

It is possible by means of said embodiment, too, for the friction force between the mounting section and the second component to be increased.

It is self-evident that the measures for increasing the friction force may also be combined with one another.

It is also advantageous for the radial spring section of the anti-rattle component to be of weakened design in relation to the mounting section and/or in relation to the anti-rattle toothing in order to increase the radial elasticity of the anti-rattle component.

The weakening may for example be provided in that the anti-rattle component is formed with a smaller material thickness in the region of the radial spring section. It is also alternatively or additionally possible for the weakened region to be provided by virtue of the anti-rattle component being provided, in the region of the radial spring section, with recesses for increasing the radial elasticity.

While it is the case in the second aspect of the present invention that the anti-rattle component is preferably in frictional engagement with the second component (that is to say is in frictional engagement in the drive direction with the second component in the steady state), it is also possible in an alternative embodiment of the second aspect for the anti-rattle component to be connected in a positively locking manner in the drive direction to the second component.

In said embodiment, the anti-rattle characteristic of the anti-rattle component may be realized substantially by means of the radial and/or tangential elasticity of the anti-rattle component.

It is also self-evident here that, in said embodiment too, as in all the other embodiments specified above, the anti-rattle toothing of the anti-rattle component may also be of elastic design in the drive direction (that is to say tangentially) in order to dampen relative movements of the first and second components.

Overall, the following should additionally be noted: it is sought to obtain as far as possible a 100% elimination of play by means of the anti-rattle component, which is preferably pressed into the counterpart gear tooth space with low forces of for example up to 50 N, in particular up to 30 N and particularly preferably up to 10 N) and small travels (in particular <20 micrometers, preferably approximately 2-4 micrometers). The rolling effects as the toothings rotate are not hindered, and tonal and other stochastic noise effects, in particular rattling, are prevented or at least considerably reduced.

The following aspects are therefore important:

The application may be applied to any desired rotating rolling external or internal toothings, that is to say spur gear mechanisms, planetary gear sets The application may also be applied to any desired spline toothings, for example clutch spline/plug-in toothings The application may also be used with any desired claw-type toothings The application may also be used very generally with any desired shaft/hub connections, for example in addition to or as a replacement for the parallel key. The disadvantage of the latter is that it is always afflicted with play. This is a disadvantage in the event of oscillation of one or other of the components of the shaft/hub connection, because shock effects/rattling can occur on account of the play/non-linearities. Therefore, if instead of the classic parallel key a parallel key in the manner of the anti-rattle component (for example micro-gearwheel), for example one tooth as an extreme simplification of the micro-gearwheel, is pressed radially elastically and/or tangentially elastically into the counterpart tooth space or parallel key groove of the counterpart component (shaft or hub), rattling effects can no longer occur or said rattling effects can be reduced.

The forces of the micro-gearwheel may preferably be generated such that the anti-rattle component (micro-gearwheel), with two-flank rolling engagement caused by its teeth being thicker than the greatest counterpart gear tooth space, is pressed radially elastically into the counterpart gear tooth space. The forces imparted for this purpose may generally also be generated as desired by magnets, spring force, hydraulics, pneumatics, etc, even if only the variant of spring elasticity is proposed here.

In the case of straight toothings, the anti-rattle component (micro-gearwheel) may be arranged as desired on one or the other or simultaneously on both sides of the mother gearwheel. In the case of helical toothings, preferred sides for the axial arrangement, for example one or the other side of the mother gearwheel, may arise according to the direction of the helix angle. This is because, in this case, the micro-gearwheel could be either pushed axially against or away from the mother gearwheel as a result of the resulting superposition of forces. Overall, however, the specified designs should preferably be dimensioned such that, regardless of the forces acting, the rattling effect is suppressed by as close to 100% as possible, the radial and/or tangential shear elasticity is provided and/or the micro-gearwheel remains in a non-positively or positively locking fashion in its position without undesirably pressing axially against the mother gearwheel or being pushed away from the latter. In some of the specified designs, it may not be possible to freely select the arrangement of the micro-gearwheel on a desired end side of the mother gearwheel. If such constrained circumstances result in an unfavourable position of the micro-gearwheel, and associated therewith also unfavourable force superpositions, then it is necessary to select suitable constructions, such as support rims, spring rings, etc., to ensure that the micro-gearwheel is not undesirably pushed away from the mother gearwheel.

The anti-rattle component is preferably designed as an annular element. The ratio of outer diameter of the annular element preferably lies in the range from 100:50 to 100:95, in particular in the range from 100:60 to 100:85, in particular in the range from 100:70 to 100:80. In this way, the anti-rattle component may be formed with a low weight.

It is self-evident that the features specified above and the features yet to be explained below may be used not only in the respectively specified combination but rather also in other combinations or individually without departing from the scope of the present invention.

BRIEF DESCRIPTION OF THE SEVERAL
VIEWS OF THE DRAWING

Exemplary embodiments of the invention are illustrated in the drawing and will be explained in more detail in the following description. In the drawing:

FIG. 1 schematically shows a developed view of a component pairing comprising a fixed wheel and a loose wheel according to a first embodiment of the invention;

FIG. 2 shows a view similar to FIG. 1, with a thrust flank of the fixed wheel having moved away from a rear flank of the loose wheel;

FIG. 3 shows a view similar to FIG. 1, with a rear flank of the fixed wheel bearing against a thrust flank of the loose wheel;

FIG. 14 shows a further embodiment of a component pairing according to the invention in an exploded view, illustrating a modification of the component pairing shown in FIGS. 9 and 10;

FIG. 15 shows a partial section of the component pairing of FIG. 14 in an enlarged illustration;

FIG. 16 shows an exploded view of a component pairing according to a further embodiment of the invention, illustrating a modification of the embodiment of FIGS. 9 and 10;

FIG. 28 shows a view, similar to FIG. 27, of a component pairing illustrating a modification of the embodiment of FIGS. 25 to 27;

FIG. 29 shows a view, similar to FIG. 27, of a further embodiment of a component pairing illustrating a modification of the component pairing of FIGS. 25 to 27;

FIG. 30 shows an illustration, similar to FIG. 27, of a further component pairing illustrating a modification of the component pairing of FIGS. 25 to 27;

DETAILED DESCRIPTION OF THE INVENTION

Figure 4:
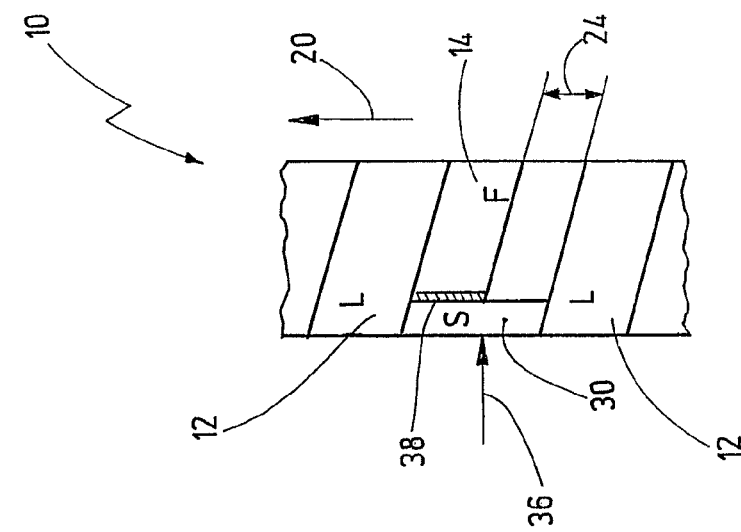
FIG. 4 shows an illustration, similar to FIG. 1, of a further component pairing according to the present invention, with the components having helical toothings.

A first embodiment of a mechanical component pairing is illustrated in FIGS. 1 to 3 and is denoted generally by 10.

The component pairing 10 has a first component 12 in the form of a loose wheel and a second component 14 in the form of a fixed wheel. In the present case, the fixed wheel 14 is the driving component. The loose wheel 12 has a first component toothing 16. The fixed wheel 14 has a second component toothing 18.

The loose wheel 12 is driven by means of the fixed wheel 14 in a drive direction 20. Here, a thrust flank 22 of the second toothing 18 makes contact with a rear flank 26 of the first toothing 16.

The toothings 16, 18 are formed with a certain tooth flank play, which is denoted in FIG. 1 by 24.

In the present case, the tooth flank play 24 is the distance between a rear flank of the second toothing 18 and a thrust flank 28 of the first toothing.

Toothings of said type are generally known. On account of the tooth flank play 24, so-called rattling noises can occur in the event of high-frequency excitation on the drive input side. Here, the toothings 16, 18 turn over, such that the flanks 27, 28 and the flanks 22, 26 alternately come into contact.

Such high-frequency excitations can occur in particular when a component pairing 10 of said type is used in a drivetrain of a motor vehicle, for example in a multi-stage gearbox or spur gear gearbox of a drivetrain of said type. This is true in particular if the gearbox is coupled at the input side to a drive engine which generates vibrations, such as for example an internal combustion engine.

To prevent said rattling noises, the component pairing 10 is equipped with an anti-rattle mechanism which comprises an anti-rattle component 30. The anti-rattle component 30 is coupled to the fixed wheel 14, specifically in such a way that the anti-rattle component 30 is movable relative to the fixed wheel 14 in the drive direction 20. The anti-rattle component 30 is in engagement with a first anti-rattle toothing 32 which is provided on the loose wheel 12. For this purpose, the anti-rattle component 30 has a second anti-rattle toothing 33.

The first anti-rattle toothing 32 may be an axial portion of the first toothing 16. The first anti-rattle toothing 32 may however also be shaped differently than the first toothing 16 but formed so as to be aligned axially with respect to said first toothing 16.

The anti-rattle component 30 is produced with relatively high precision, such that a circumferential play 34 between the anti-rattle toothings 32, 33 is smaller than the tooth flank play 24.

The anti-rattle component 30 is also guided with the fixed wheel 14 by means of a frictional engagement 38. For this purpose, corresponding friction surfaces are formed on the anti-rattle component 30 (or on components connected thereto) and on the fixed wheel 14 (or components connected thereto), which friction surfaces are preferably placed in engagement with one another by means of an axial pressure force 36. The corresponding illustration in FIGS. 1 to 3 is schematic and is intended merely to indicate that the anti-rattle component 30 can be moved in the drive direction 20 relative to the fixed wheel 14, wherein a certain friction force must be overcome here on account of the frictional engagement 38. Rattling noises as described above can be considerably reduced or even completely eliminated by means of said anti-rattle mechanism.

If the thrust flank 22 of the second toothing 18 moves away from the rear flank 26 of the first toothing 16 on account of a high-frequency excitation, the anti-rattle component 30 is driven concomitantly here on account of the frictional engagement. At a certain time, which is shown in FIG. 2, the rear flank 26 of the second anti-rattle toothing 33 abuts against a corresponding thrust flank 22 of the first anti-rattle toothing 32 (the circumferential play 34 is overcome).

On account of the high-frequency excitation, the fixed wheel 14 is then moved further in the turn-over direction. Here, said movement is however retarded or braked or dampened on account of the frictional engagement. Accordingly, the rear flank 27 of the fixed wheel 14 abuts against the thrust flank 28 of the loose wheel 16 with a considerably reduced speed (ideally with a speed of zero, or not at all) (FIG. 3).

In this way, rattling noises such as occur in conventional component pairings can be efficiently reduced.

The anti-rattle component 30 is preferably produced from plastic, in particular from polyamide. The first component 12 and the second component 14 are preferably produced from metal, for example from steel alloys using chrome, nickel, molybdenum, etc.

During the backward movement of the fixed wheel 14 in relation to the loose wheel 12, the same process takes place. The anti-rattle component 30 is firstly driven concomitantly by the fixed wheel 14 until the thrust flank thereof abuts against the rear flank 26 of the first anti-rattle toothing 32. As a result, the further movement of the fixed wheel 14 towards the loose wheel 12 is again retarded on account of the frictional engagement 38. It can therefore be achieved that the thrust flank 22 then abuts against the rear flank 26 at only a low speed (or ideally with a speed of zero, or not at all).

The component pairing shown in FIGS. 1 to 3 has two gearwheels 12, 14 which have straight toothings. The component pairing according to the invention may however also be designed as a pairing composed of a toothed rack and a gearwheel. The processes are completely identical.

The following figures show alternative or modified embodiments of component pairings which generally correspond in terms of design and mode of operation to the component pairing 10 of FIGS. 1 to 3. The same elements are therefore denoted by the same reference numerals. Only the differences in each case will be explained below.

Figure 5:
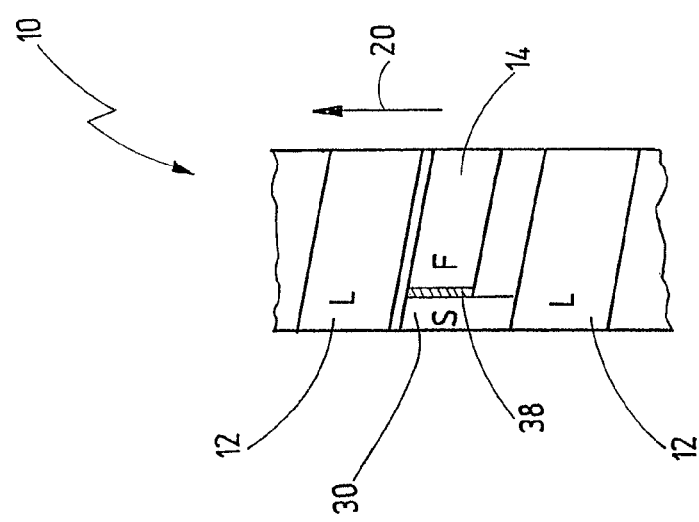
FIG. 5 shows a view, corresponding to FIG. 2, of the component pairing of FIG. 4.
Figure 6:
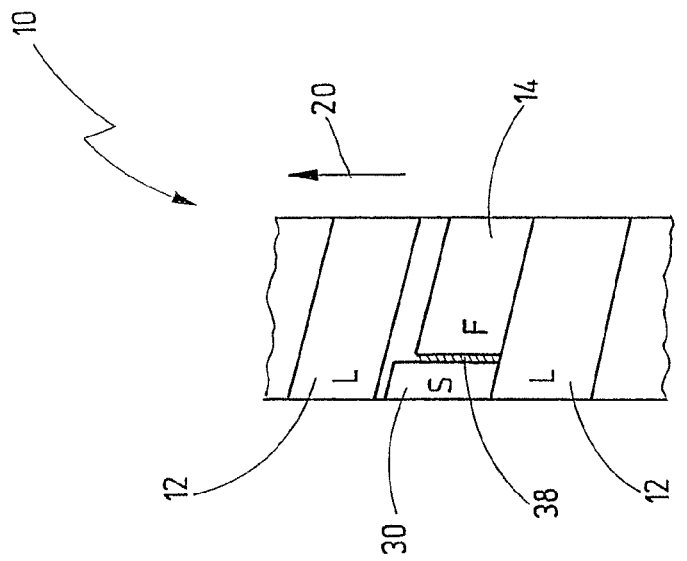
FIG. 6 shows a view, similar to FIG. 3, of the component pairing of FIG. 4.

FIGS. 4 to 6 show a further component pairing in which the fixed wheel 14 and the loose wheel 12 have helical toothings.

Figure 7:
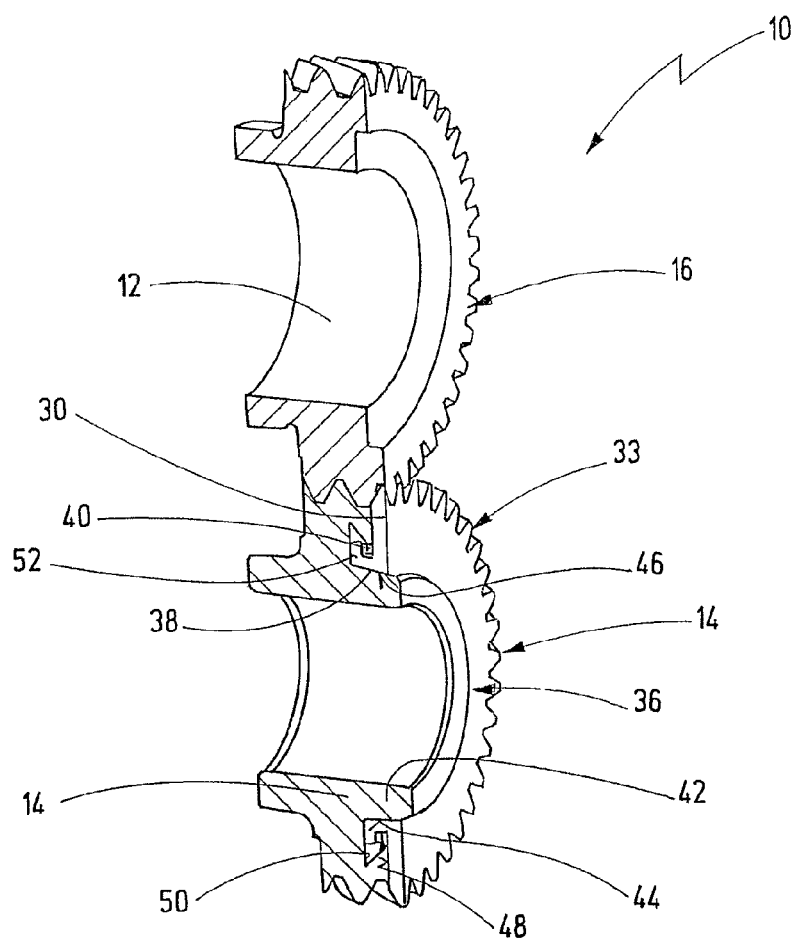
FIG. 7 shows a perspective sectional view of a further embodiment of a component pairing according to the invention.
Figure 8:
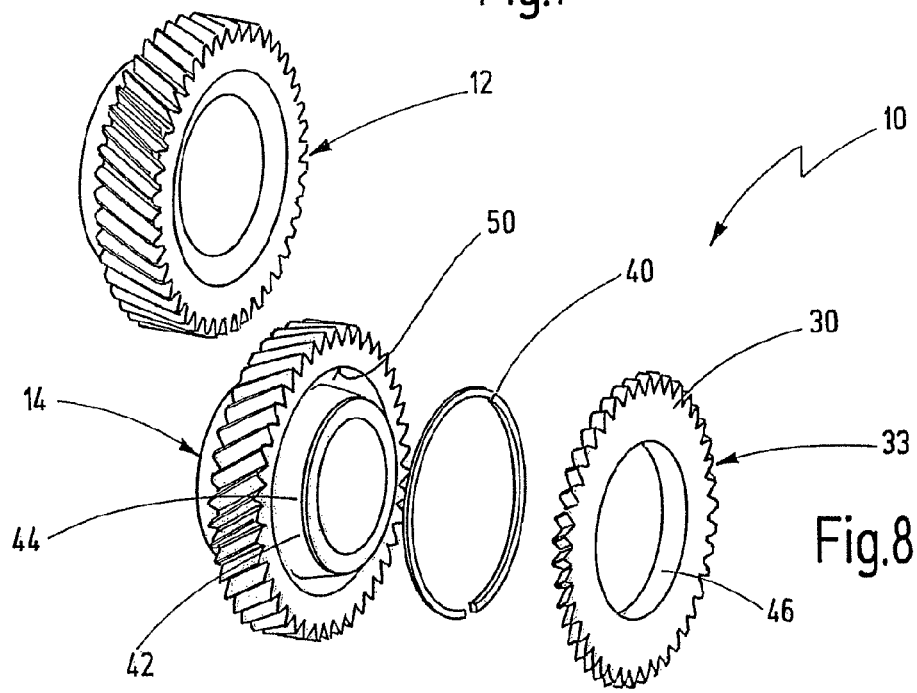
FIG. 8 shows an exploded view of the components of the component pairing of FIG. 7.

FIGS. 7 and 8 show a further embodiment of a component pairing according to the invention. In the component pairing 10 of FIGS. 7 and 8, the anti-rattle component 30 and the fixed wheel 14 are coupled to one another by means of a circlip or Seeger ring 40.

Here, the fixed wheel 14 has a first annular projection 42 which is formed on its outer circumference with a conical friction section 44. Correspondingly, the anti-rattle component 30 has a conical friction section 46 on the inner circumference. The anti-rattle component 30 is consequently guided in the drive direction 20 by means of the first annular projection 42. Furthermore, frictional engagement 38 takes place between the first annular projection 42 and the inner circumference of the anti-rattle component 30.

To generate the pressure force 36 for the frictional engagement 38, the fixed wheel 14 has a second annular projection 48 which is arranged radially outside but concentrically with respect to the first annular projection 42.

At the radially inner side, the second annular projection 48 has a conically tapering undercut radial groove 50. The anti-rattle component 30 has an annular web on the side facing towards the fixed wheel 14, with the circlip 40 being inserted into a radial groove of the annular web 52. During the assembly of the anti-rattle component 30 on the fixed wheel 14, the anti-rattle component 30 is pushed onto the first annular projection 42 until the circlip 40, which is preloaded in the circumferential direction or radially outwards, engages behind the radial groove 50 of the second annular projection 48.

Since the radial groove 50 tapers conically, this causes the anti-rattle component 30 to be pulled onto the fixed wheel 14, such that the friction sections 44, 46 come into frictional engagement 38.

Instead of a second annular projection 48, it is also possible for a groove to be provided which extends under the second toothing 18, as illustrated in FIG. 7.

Figure 9:
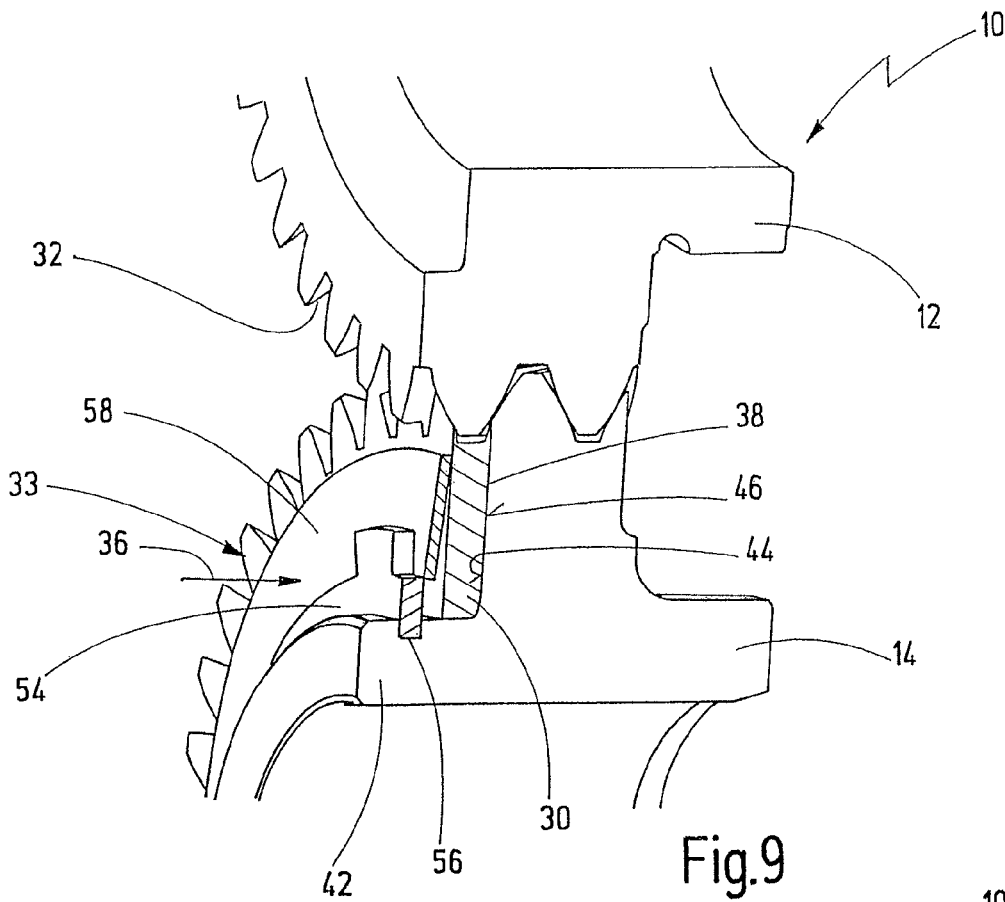
FIG. 9 shows a perspective sectional view of a component pairing according to a further embodiment of the invention.
Figure 10:
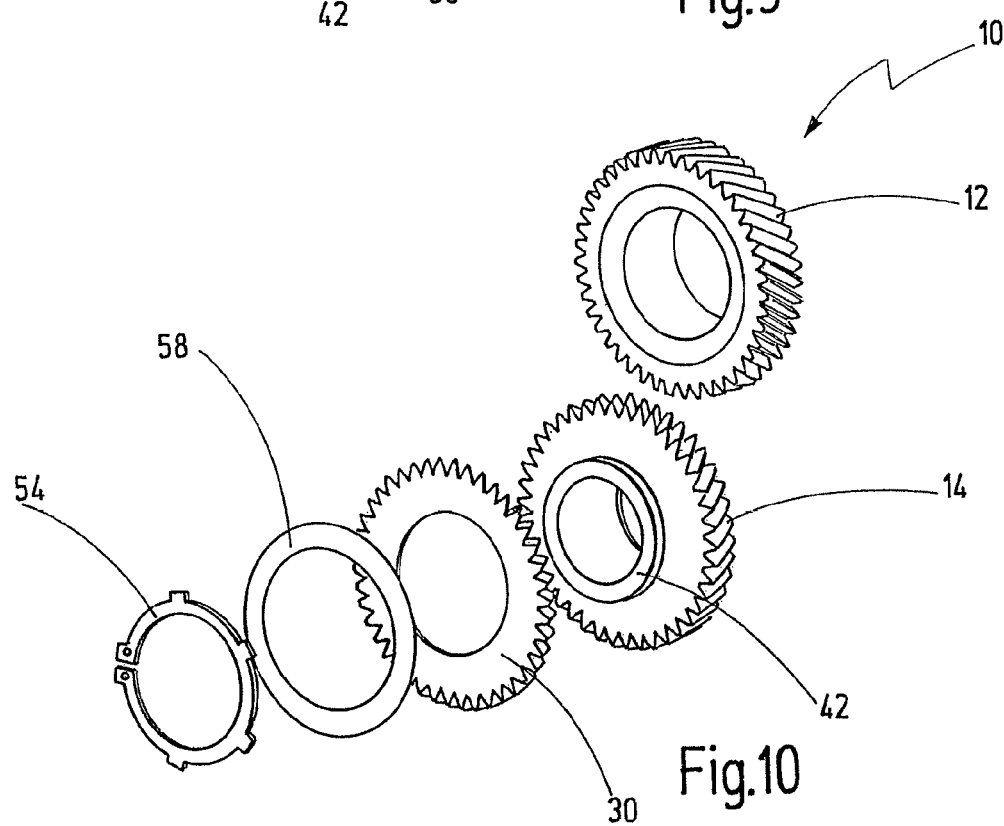
FIG. 10 shows an exploded view of the components of the component pairing of FIG. 9.

FIGS. 9 and 10 show a further embodiment of a component pairing 10 according to the invention.

In the component pairing 10, the fixed wheel 14 again has a first annular projection 42 onto which the anti-rattle component 30 is pushed axially.

Furthermore, a radial groove 56 is provided on the outer circumference of the first annular projection 42, into which radial groove 56 a spring ring 54 (for example a Seeger ring) is inserted. Furthermore, the anti-rattle mechanism of the component pairing 10 of FIGS. 9 and 10 comprises an annular plate spring 58 which is arranged between the axially outer side of the anti-rattle component 30 and the axially inner side of the spring ring 54. The annular plate spring 58 pushes the anti-rattle component 30 in the axial direction against a radially extending surface of the fixed wheel 14, which surface forms the friction section 44. The friction section 46 of the anti-rattle component 30 is in the present case formed as a radial surface which can for example bear flat against the corresponding friction section surface of the fixed wheel 14.

Figure 11:
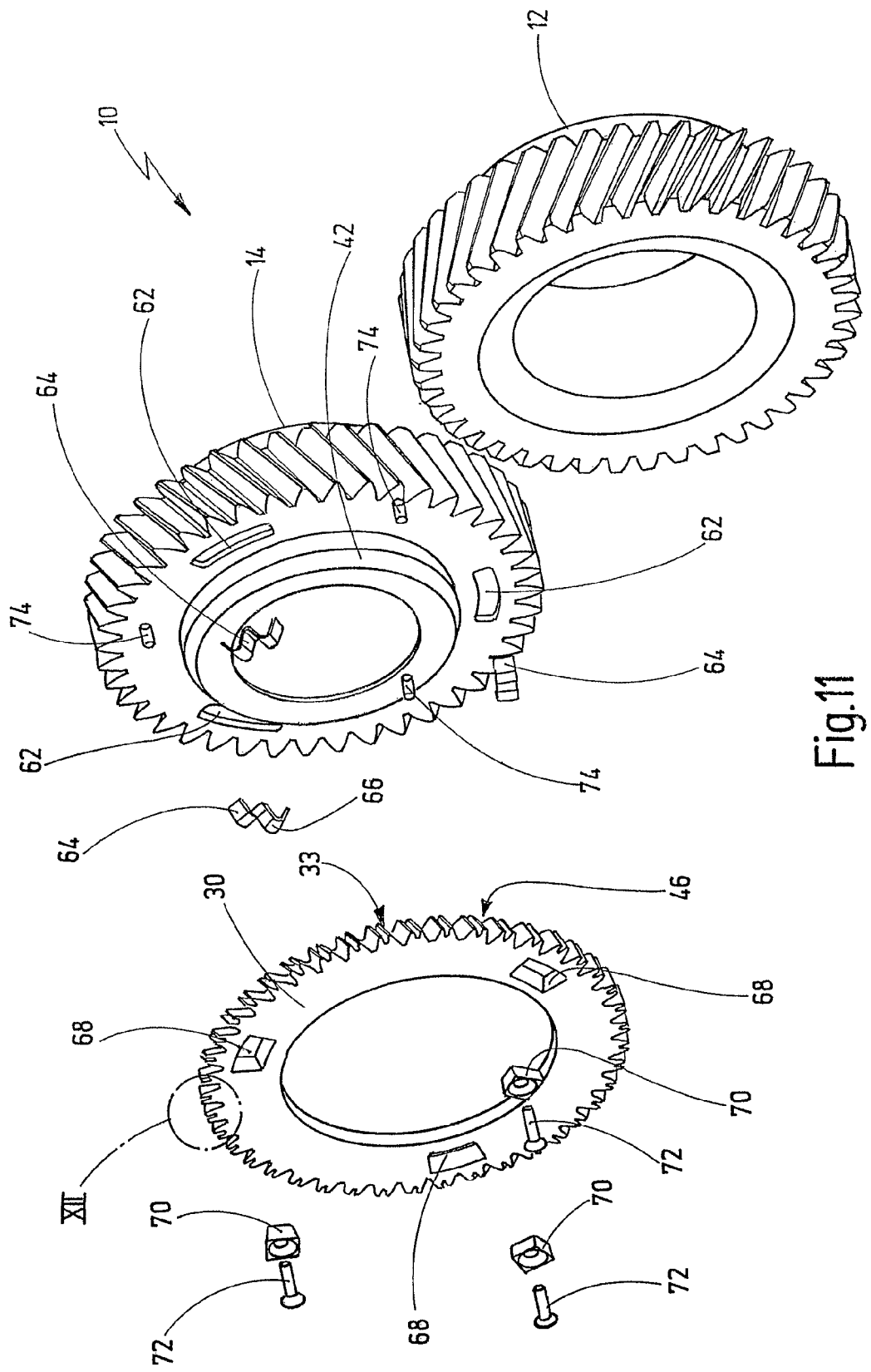
FIG. 11 shows an exploded view of a component pairing according to a further embodiment of the invention.

FIG. 11 shows a further embodiment of a component pairing 10 according to the invention.

The fixed wheel 14 of the component pairing 10 of FIG. 11 has a multiplicity of axial depressions 62 distributed over the circumference on one end side, into each of which axial depressions 62 are inserted corrugated springs 64. Those surfaces of the corrugated springs 64 which face away from the fixed wheel 14 are formed as friction sections 66 (corresponding to the friction section 44).

The anti-rattle component 30 is formed with a multiplicity of axial holes 68 which are distributed over the circumference and into which pressure blocks 70 can be inserted. By means of the pressure blocks, screws 72 can be screwed into corresponding threaded holes 74 on the end side of the fixed wheel 14.

The corrugated springs 64 are of elastically deformable design. The friction sections 66 of the corrugated springs 64 engage on the end side (not illustrated in FIG. 11) of the anti-rattle component 30 (at 46).

The multiplicity of axial depressions 62 and the multiplicity of threaded holes 74 on the end side of the fixed wheel 14 are formed so as to be offset in the circumferential direction.

Figure 12:
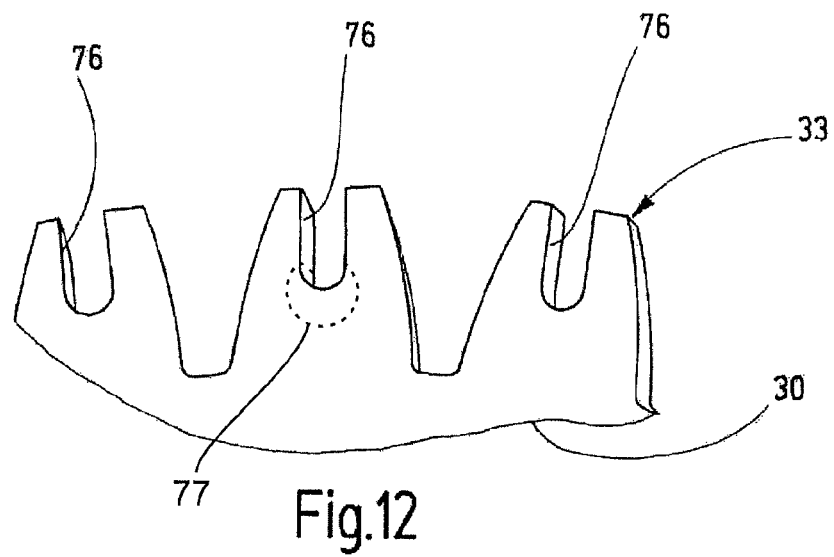
FIG. 12 shows a detail view of a detail XII from FIG. 11.

FIG. 12 shows a detail XII of FIG. 11. It can be seen that the second anti-rattle toothing 33 of the anti-rattle component 30 is formed with teeth which have radially inwardly directed radial spring grooves 76 proceeding from the tooth tip.

The radial spring grooves 76 increase the elasticity of the teeth of the second anti-rattle toothing 33 in the drive direction 20, such that the impact against corresponding teeth of the first anti-rattle toothing 32 (after the circumferential play 34 is overcome) can be dampened more effectively.

It is indicated at 77 that the elasticity of the teeth of the second anti-rattle toothing 33 in the drive direction 20 can be increased yet further by virtue of axial recesses 77 being provided in the anti-rattle component at the base of the radial spring grooves 76, which axial recesses 77 are preferably wider than the width of the radial spring grooves 76.

Figure 13:
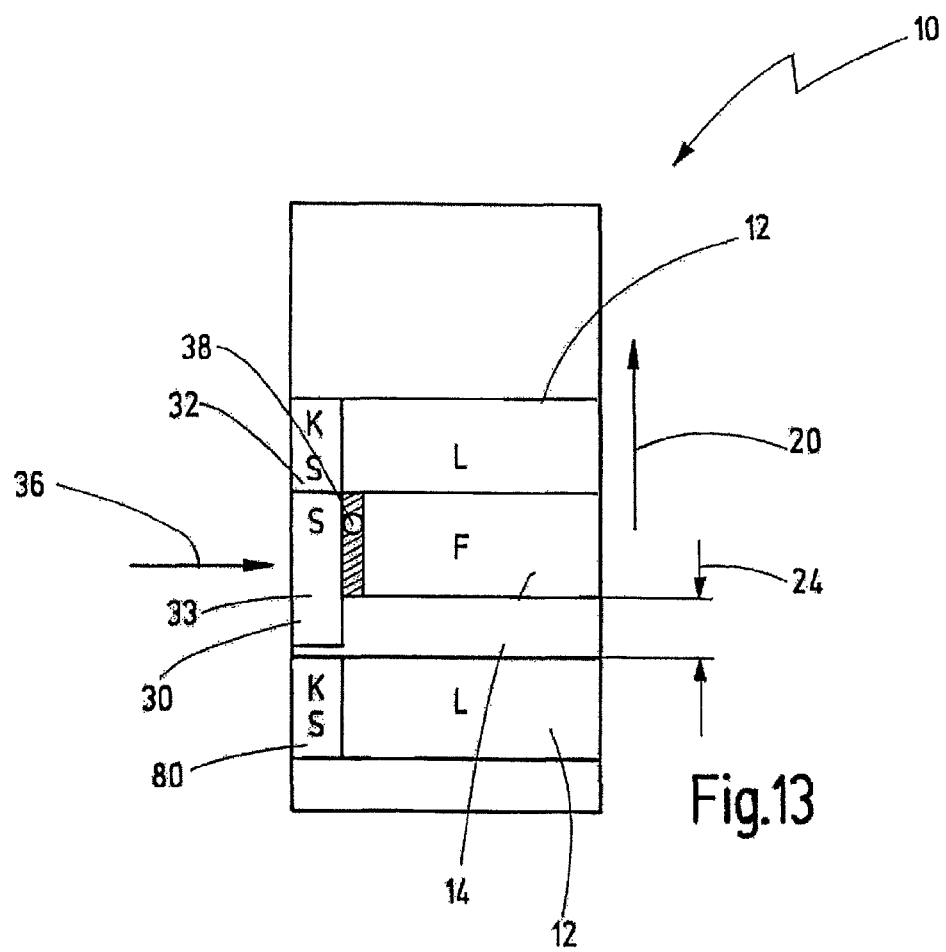
FIG. 13 shows a view, similar to FIG. 1, of a further embodiment of a component pairing according to the invention.

FIG. 13 shows a further alternative embodiment of a component pairing 10 which generally corresponds to the component pairing of FIGS. 1 to 3.

In the component pairing 10 of FIG. 13, a counterpart or complementary component 80 is provided for the purpose of forming the first anti-rattle toothing 32, which counterpart or complementary component 80 may likewise be designed as a gearwheel or toothed disc. Here, the counterpart component 80 is fixedly or rigidly connected to the loose wheel 12. In said embodiment, the counterpart component 80 may be formed from a different material than the loose wheel 12, for example from a plastic material such as polyamide. Alternatively, the counterpart component 80 may however also be composed of a metallic material. In all of the abovementioned embodiments, the anti-rattle component 30 may generally be produced from metal if the required precision can be achieved.

FIGS. 14 to 34, which are described below, show further embodiments of component pairings 10 which generally correspond in terms of design and function to the embodiments described above. The same elements are therefore denoted by the same reference numerals. Only the differences in each case will be explained below.

Each of the embodiments discussed below may also be combined with the embodiments described above (for example with regard to the elasticity of the second anti-rattle toothing 33 in the drive direction, as shown in FIG. 12).

FIGS. 14 and 15 show a further alternative embodiment of a component pairing 10 illustrating a modification of the component pairing 10 of FIGS. 9 and 10. The component pairing 10 of FIGS. 14 and 15 corresponds in terms of design and function to the component pairing 10 of FIGS. 9 and 10 unless stated otherwise.

The component pairing 10 of FIGS. 14 and 15 comprises a pressure ring 84 arranged axially adjacent to the anti-rattle component 30, which pressure ring 84 is connected in a positively locking manner in the drive direction 20 to the anti-rattle component 30 by means of suitable positive-locking means (axial pegs and axial holes in the illustrated embodiment). The pressure ring 84 may for example be produced from metal, whereas the anti-rattle component 30 may for example be produced from a plastic. In said embodiment, the pressure ring 84 may serve to transmit the axial pressure force of the annular plate spring 58 more uniformly to the anti-rattle component 30. The effectiveness of the frictional engagement 38 between the anti-rattle component 30 and the second component 14 can accordingly be increased.

FIG. 16 shows a further alternative embodiment of a component pairing 10, which generally corresponds in terms of design and function to the embodiment of FIGS. 9 and 10. Only differences will be explained below.

The component pairing 10 of FIG. 16 comprises an anti-rattle component 30 which has a greater inner diameter than an axial annular projection 42 of the second component 14. On the axial side facing away from the second component 14, the anti-rattle component 30 is formed with a rounded surface 85 which tapers inwards convexly or concavely in longitudinal section (not shown).

Said rounded surface 85 is assigned a friction ring 86 (for example in the form of an O-ring or of a spring ring composed of metal) which bears against the rounded surface 85. The friction ring 86 is pressed in the axial direction against the rounded surface 85 by means of a pressure ring 84. The pressure ring 84, or a terminating element 88 in the form of an annular element arranged axially yet further outward, may be designed to form a friction section 46 on the inner circumference, which friction section 46 can come into frictional engagement with a corresponding friction section 44 on the annular projection 42 of the second component 14. The pressure ring may however also be designed, as illustrated in FIG. 16, to be screwed onto the annular projection 42 of the second component 14 in order to brace the friction ring 86 with the anti-rattle component 30. In this case, the terminating element 88 may be designed as a locking nut which prevents a release of the screw connection.

Figure 17:
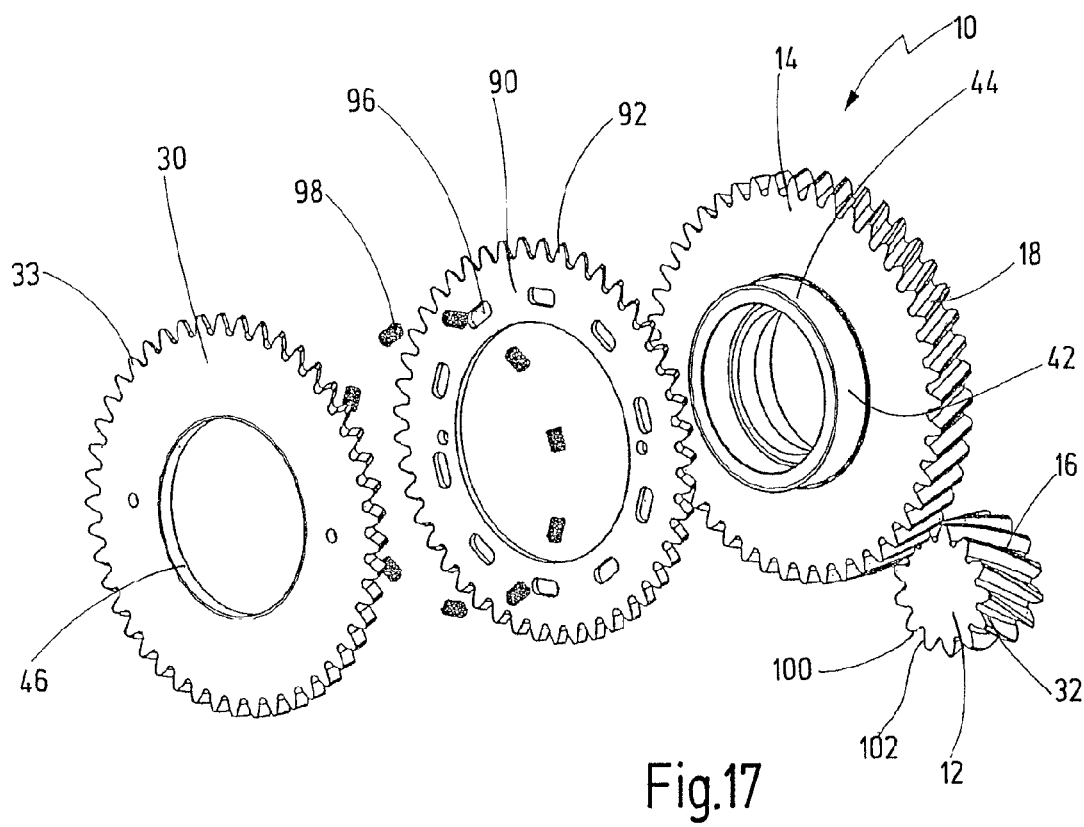
FIG. 17 shows an exploded view of a further embodiment of a component pairing according to the invention, obliquely from the front.
Figure 18:
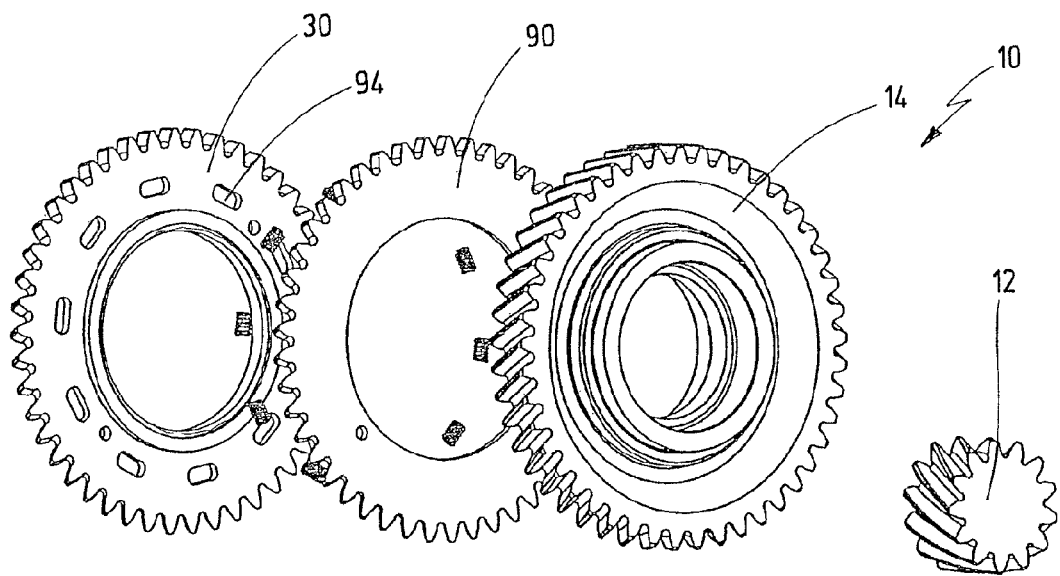
FIG. 18 shows the component pairing from FIG. 17 in an exploded view obliquely from the rear.

FIGS. 17 and 18 show a further embodiment of a component pairing 10.

In the component pairing 10 of FIGS. 17 and 18, the anti-rattle component 30 is assigned a complementary anti-rattle component 90. The complementary anti-rattle component 90 has a complementary anti-rattle toothing 92 which corresponds in terms of form and number of teeth to the anti-rattle toothing 33 of the anti-rattle component 30. The complementary anti-rattle component 90 is arranged in the axial direction between the second component 14 and the anti-rattle component 30. The anti-rattle component 30 has a multiplicity of axial pockets 94 on the axial side facing towards the complementary anti-rattle component 90. Correspondingly, the complementary anti-rattle component 90 has a plurality of axial pockets 96 on the axial side facing towards the anti-rattle component 30. The anti-rattle component 30 and the complementary anti-rattle component 90 are assembled so as to bear against one another, with spring elements 98 (for example in the form of helical pressure springs or other spring elements) being held in the pockets formed by the axial pockets 94 and the axial pockets 96. By means of the spring elements 98, the anti-rattle component 30 and the complementary anti-rattle component 90 are braced against one another in the drive direction.

The pre-assembled arrangement comprising the anti-rattle component 30 and the complementary anti-rattle component 90 is subsequently arranged on the second component 14, with a friction section 46 on the inner circumference of the anti-rattle component 30 coming into frictional engagement with a friction section 44 on an annular projection 42 of the second component 14. The inner diameter of the complementary anti-rattle component 90 is greater than that of the anti-rattle component 30, such that the complementary anti-rattle component 90 is preferably not in frictional engagement with the second component 14. As a result of the bracing of the anti-rattle component 30 and of the complementary anti-rattle component 90 in the drive direction, the anti-rattle toothing 33 of the anti-rattle component 30 comes into engagement substantially only with first flanks 100 (cf. FIG. 20) of the anti-rattle toothing 32 of the first component 12. Correspondingly, the complementary anti-rattle toothing 92 of the complementary anti-rattle component 90 comes into engagement preferably with second flanks 102 of the anti-rattle toothing 32 of the first component 12. The first flanks 100 and the second flanks 102 are in each case mutually opposite flanks of adjacent teeth of the anti-rattle toothing 32.

The anti-rattle component 30 and the complementary anti-rattle component 90 form scissors-type gearwheels which may be produced for example from plastic or from metal. As a result of the scissors action of the anti-rattle component 30 and complementary anti-rattle component 90, it is possible for all production-related tolerances and thermal deformations which have an effect on the rotational flank plays to be compensated by up to 100%. Furthermore, two-flank rolling contact is provided. The forces for compressing the scissors-type gearwheels upon entry into the toothed engagement with the first component 12 are returned to the system again upon departure from said toothed engagement.

Furthermore, the outermost scissors-type gearwheel (the anti-rattle component 30) is connected to the second component 14 by frictional engagement. In this way, as is also described with regard to the embodiments above, the oscillation of the teeth of the loose wheel within the rotational flank play of the driving fixed wheel can be prevented.

The scissors-type gearwheels are spread relative to one another, without this having a direct influence on the second component 14. Accordingly, oblique positions of the scissors-type gearwheels and of the second component 14 with respect to the counterpart gearwheel 12 can be avoided. Whining can be effectively prevented in this way.

Figure 19:
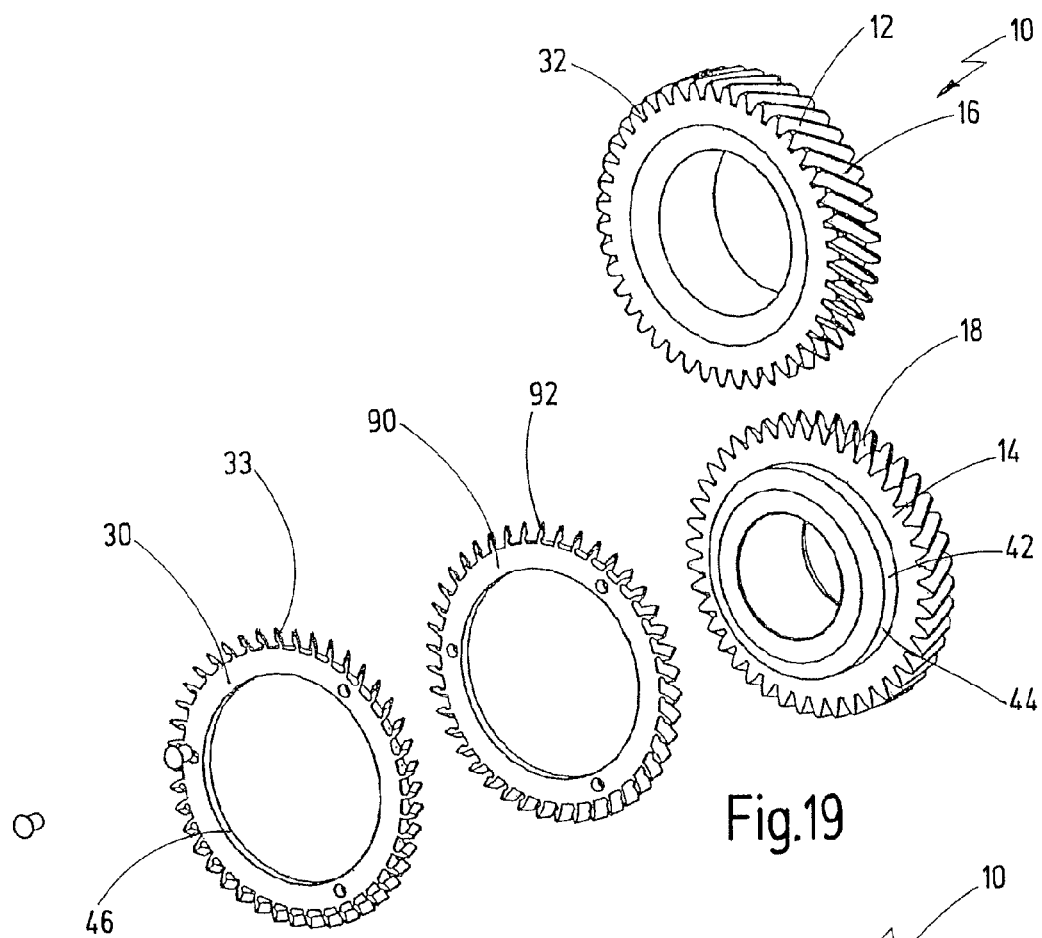
FIG. 19 shows an exploded view of a further component pairing according to an embodiment of the invention.
Figure 20:
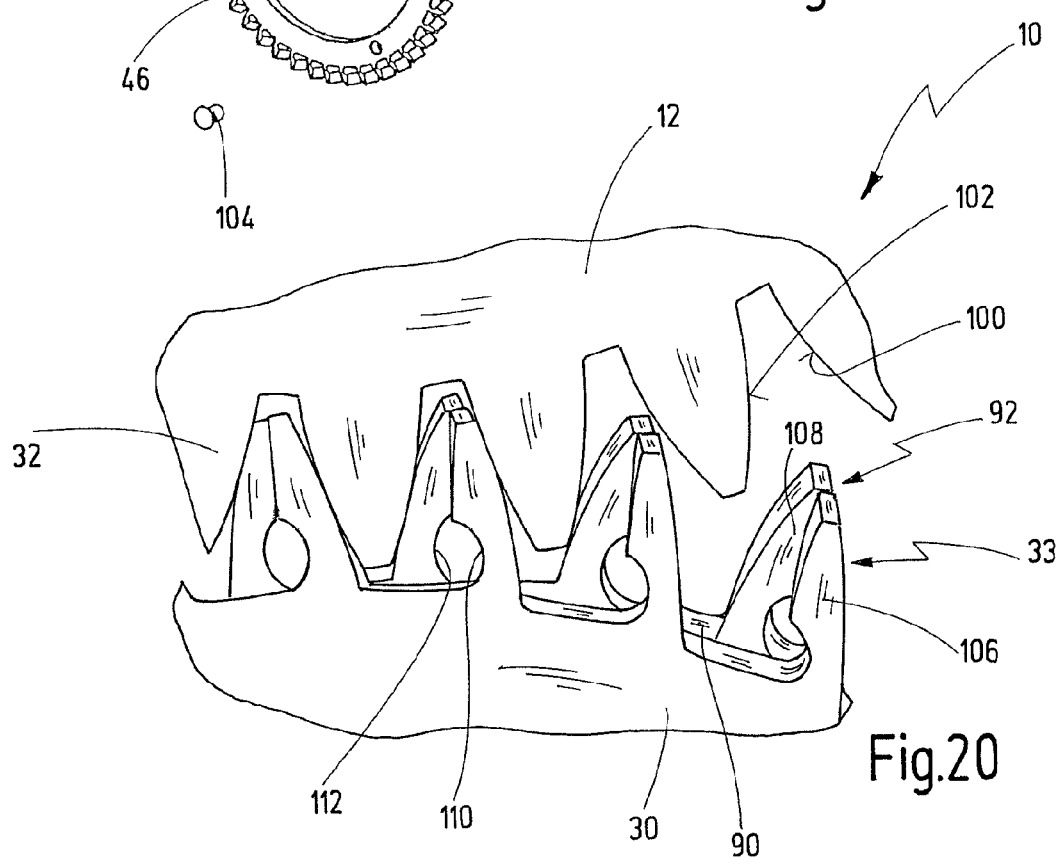
FIG. 20 shows a perspective detail view of the toothed engagement of the anti-rattle toothings of the component pairing of FIG. 19.

FIGS. 19 and 20 show a further embodiment of a component pairing 10. Said embodiment generally corresponds in terms of design and mode of operation to the component pairing 10 of FIGS. 17 and 18. Only differences are explained below.

The component pairing 10 of FIGS. 19 and 20 has a complementary anti-rattle toothing 90 which is connected in a positively locking manner in the drive direction to the anti-rattle component 30. This may take place for example by means of suitable fastening elements 104 (bolts, pins, rivets or the like). Furthermore, the anti-rattle component 30 and/or the complementary anti-rattle component 90 may have a friction section 46 which is in frictional engagement with the friction section 44 on the annular projection 42 of the second component 14.

The anti-rattle toothing 33 of the anti-rattle component 30 has radially projecting spring elements in the form of half teeth 106. Correspondingly, the complementary anti-rattle toothing 92 has radially projecting spring elements in the form of half teeth 108.

The anti-rattle component 30 and the complementary anti-rattle component 90 are connected to one another in the circumferential direction in such a way that, in axial plan view (see FIG. 20), the half teeth 106, 108 complement one another to form approximately the shape of a full tooth. Here, the half teeth 106 are designed to make contact with the first flanks 100 of the first anti-rattle toothing 32 of the first component 12. The half teeth 108 of the complementary anti-rattle toothing 92 are designed to make contact with the opposite second flanks 102 of the anti-rattle toothing 32.

The half teeth 106, 108 are selected in terms of dimensions and relative flows such that a 100% compensation of play in relation to the anti-rattle toothing 32 can be realized. Here, the half teeth 106, 108 are elastically deformable in the drive direction. For this purpose, the anti-rattle component 30 and the complementary anti-rattle component 90 may be produced from plastic such as polyamide, polyimide, etc., or from metal such as for example spring steel.

It is otherwise possible with said embodiment to obtain substantially the same advantages as can be obtained with the scissors-type gearwheels of the component pairing of FIGS. 17 and 18. In the present case, instead of spring elements 98 which act in the drive direction, the teeth 106, 108 themselves are designed as spring elements.

To influence the elasticity of the half teeth 106, 108 in the drive direction, the half teeth 106, 108 may be provided in each case with recesses in the region of their tooth root, as illustrated in FIG. 20 at 110 and 112. Said recesses 110, 112 may also for example correspond in terms of their shape to the recesses 77 shown in FIG. 12. A rounded, in particular semicircular design of the recesses 110, 112 is preferable for preventing stresses.

The following FIGS. 21 to 34 each show further embodiments of component pairings 10 which can correspond in terms of shape and mode of operation to the embodiments described above. Alternatively, or in addition, the anti-rattle component 30 is elastically deformable in the radial direction and preloaded in the radial direction against the anti-rattle toothing 32 of the first component 12 by suitable spring means. In said embodiment, too, the occurring rotational flank play can be compensated. Furthermore, the anti-rattle component 30 may be (directly or indirectly) connected to the second component 14 via a frictional engagement. It is however alternatively also conceivable in the embodiments described below for the anti-rattle component 30 to be rigidly fixed to the second component 14, even if this is not mentioned with regard to all the embodiments.

Here, the anti-rattle toothing 33 of the anti-rattle component 30 may be of rigid or stiff design. It is however particularly preferable for the anti-rattle toothing 33 of the anti-rattle component 30 to also be elastically deformable at least to a limited extent in the drive direction (as has for example been described with regard to the above FIG. 12).

In the region of the toothed engagement of the first component 12 and second component 14, the anti-rattle toothing 33 is pressed in the radial direction into the anti-rattle toothing 32 of the first component 12 in order to ensure the desired compensation of play (by up to 100%).

The embodiment with the radially elastic anti-rattle component 30 may be realized with very few components.

Figure 21:
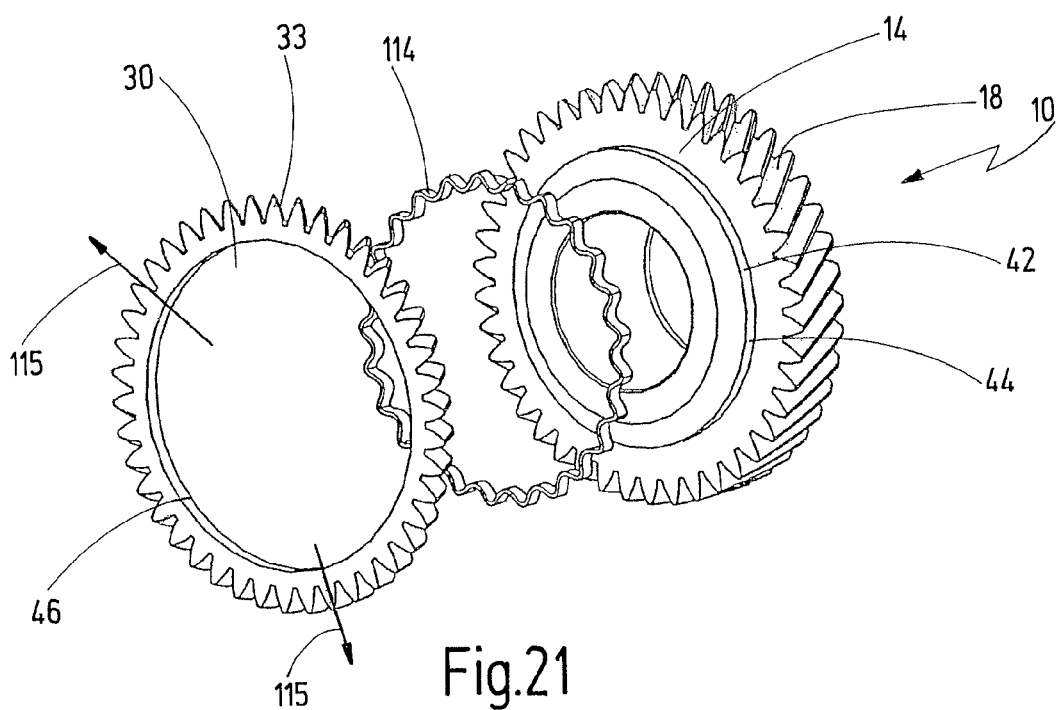
FIG. 21 shows an exploded view of a component pairing according to a further embodiment of the invention.
Figure 22:
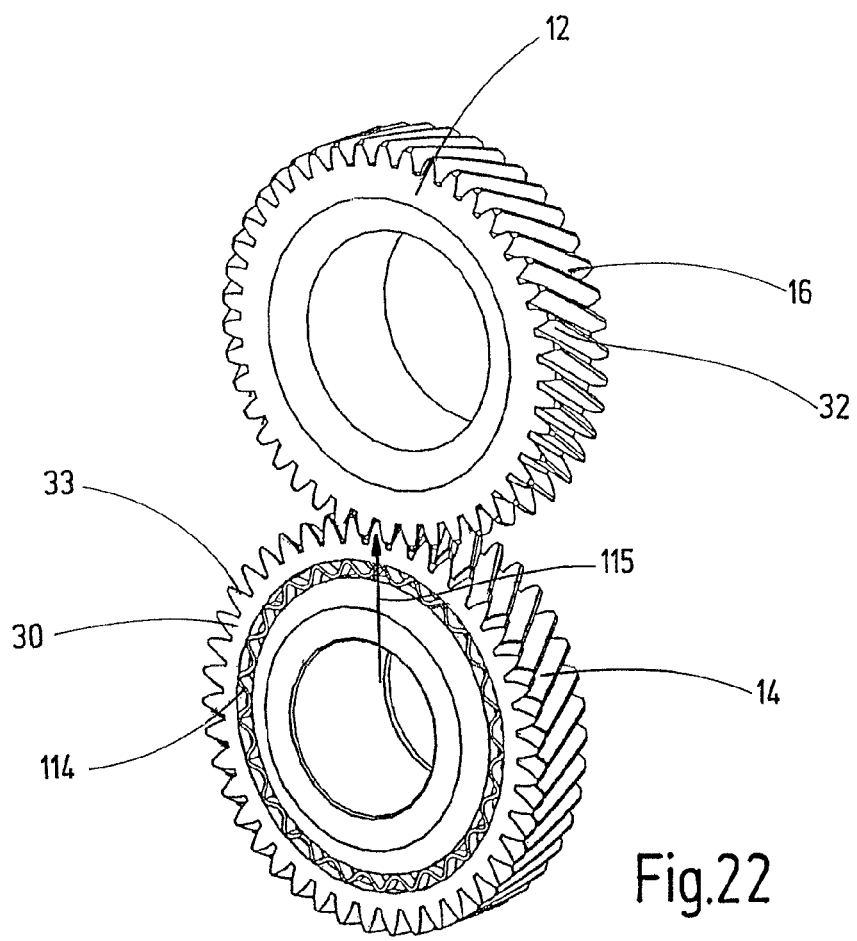
FIG. 22 shows the component pairing of FIG. 21 in the assembled state in a perspective illustration.

FIGS. 21 and 22 show a first component pairing 10 with the radially elastic anti-rattle component 30.

An inner diameter of the anti-rattle component 30 is greater than the outer diameter of an annular projection 42 of the second component 14. Furthermore, the component pairing has a radial spring element 114 in the form of an annular corrugated spring 114 which, in the assembled state (see FIG. 22), is arranged in the radial direction between the annular projection 42 and the inner circumference of the anti-rattle component 30.

The radial spring element 114 is supported in the radial direction on the annular projection 42 and exerts a spring force in the radial direction 115 on the anti-rattle component 30.

In this way, the anti-rattle toothing 33 of the anti-rattle component 30 is pressed in the radial direction into the anti-rattle toothing 32 of the first component 12 in the region of the toothed engagement between the components 12, 14, as illustrated in FIG. 22. In other words, the anti-rattle component 30 can be pushed (deflected) out of the anti-rattle toothing 32 counter to the spring force.

Here, it is self-evident that the dimensions of the teeth of the anti-rattle toothing 33 may be suitably adapted to prevent contact between the tooth tips of the anti-rattle toothing 33 and the tooth root of the anti-rattle toothing 32.

The radial spring element 114 may be designed as a separate component, as illustrated in FIGS. 21 and 22. The radial spring element 114 may be a component composed of plastic or of a spring steel. The anti-rattle component 30 is preferably a plastic part, though may also be formed from metal.

Furthermore, the radial spring element 114 may be formed in one piece with the anti-rattle component 30. In this case, the number of parts of the component pairing 10 can be reduced further.

Figure 23:
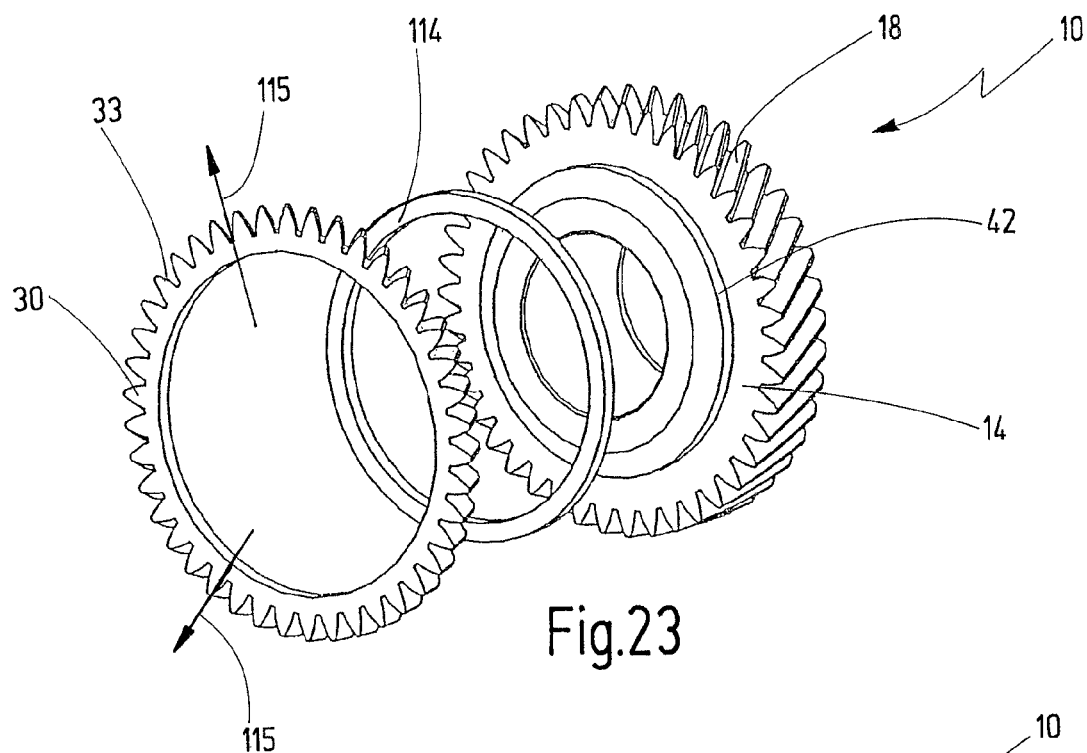
FIG. 23 shows an exploded view of a component pairing according to a further embodiment of the invention.
Figure 24:
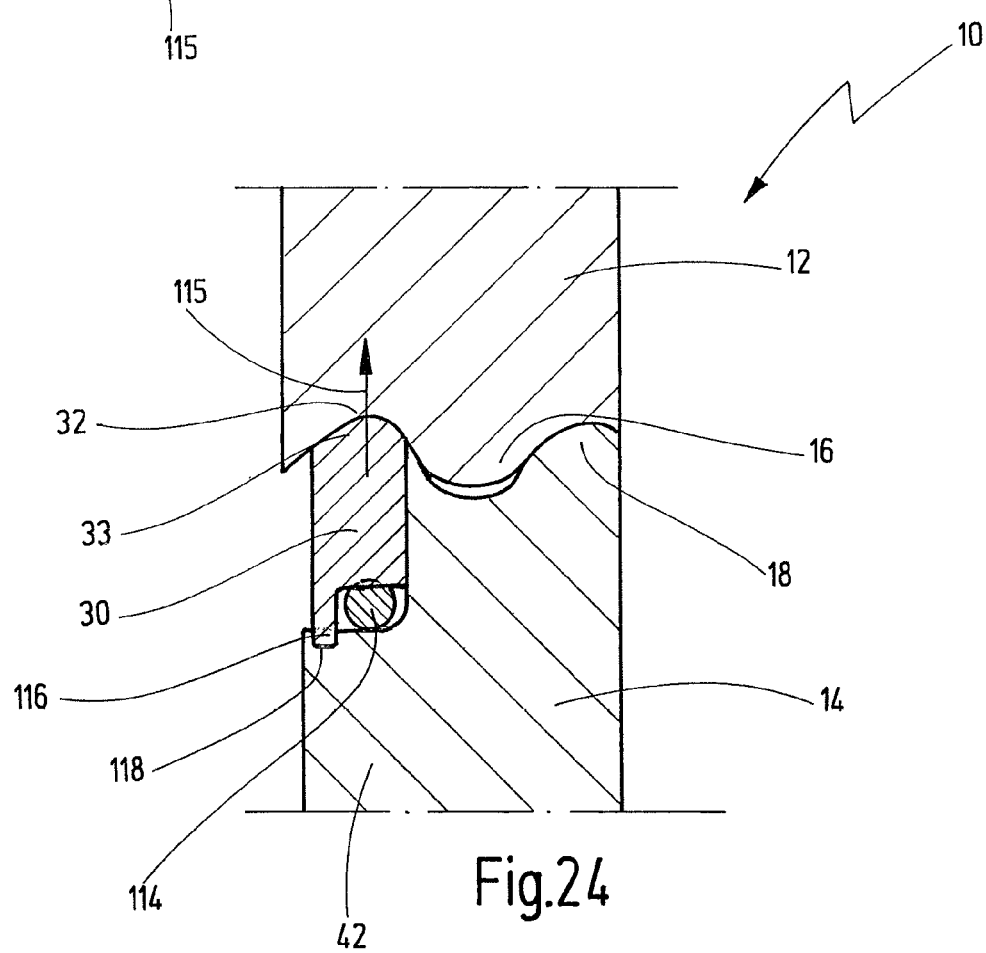
FIG. 24 shows a longitudinal section of a detail of the component pairing of FIG. 23.

FIGS. 23 and 24 show further embodiments of component pairings 10 which generally correspond in terms of design and function to the embodiment of FIGS. 21 and 22. The same elements are therefore provided with the same reference numerals.

Instead of a corrugated spring element, a radial spring element 114 in the form of a "coil" spring (for example with a polygonal shape in cross section) is provided in the embodiment of FIG. 23. The mode of operation is however substantially identical to the corrugated spring element of FIGS. 21, 22.

FIG. 24 shows that a rubber spring (in the manner of an O-ring) may be used as the radial spring element 114.

FIG. 24 also shows how the anti-rattle component 30 can be fastened to the second component 14. For this purpose, the anti-rattle component 30 has, on its inner circumference, a mounting section 116 which engages into a radial groove 118 on an annular projection 42 of the second component 14. Here, a frictional engagement 38 may be provided between the mounting section 116 and the second component 14.

The mounting section 116 may for example be of thinner design in the axial direction than the main section of the anti-rattle component 30 on which the anti-rattle toothing 33 is formed. In this way, in the installed state, a chamber can be formed between the radial underside of the shoulder thus formed and the radial outer side of the annular projection 42, which chamber can serve for holding (and securing in position) the radial spring element 114.

It is self-evident that a similar type of construction may also be applied to the component pairings of FIGS. 21 to 23.

Figure 25:
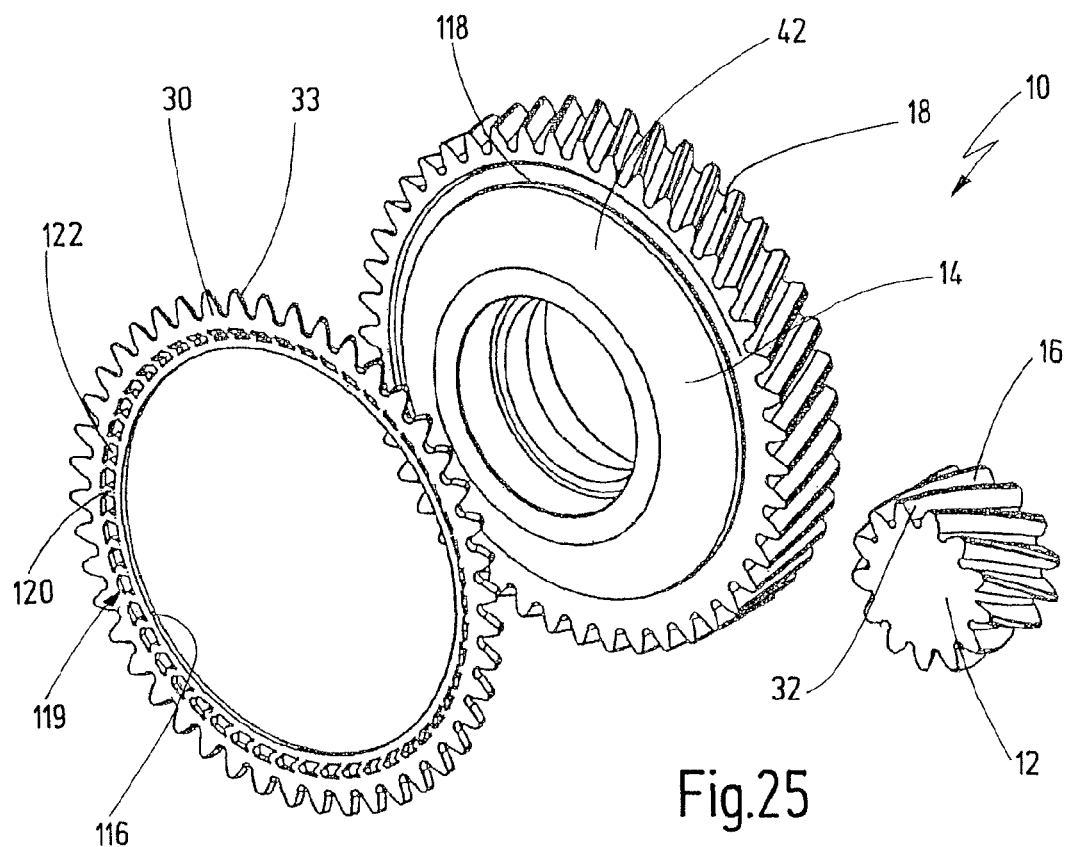
FIG. 25 shows an exploded illustration of a component pairing according to a further embodiment of the invention.
Figure 26:
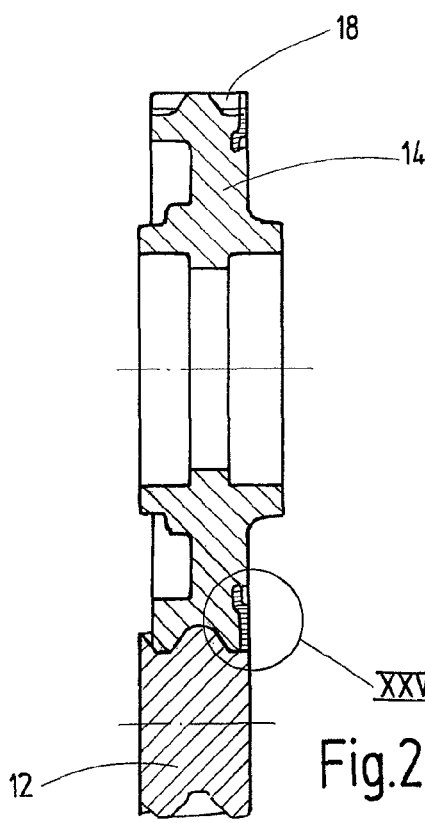
FIG. 26 shows a longitudinal sectional view of the component pairing of FIG. 25.
Figure 27:
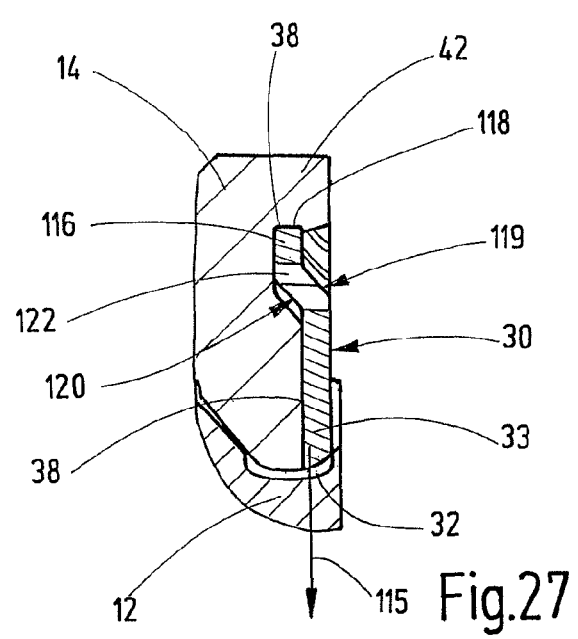
FIG. 27 shows a detail view of the detail XXVII of FIG. 26.

FIGS. 25 to 27 show a further embodiment of a component pairing 10 which generally corresponds in terms of design and function to the embodiments of FIGS. 21 to 24. Only differences are explained below.

In the component pairing 10 of FIGS. 25 to 27, the anti-rattle component 30 has a radial spring section 119 radially within the anti-rattle toothing 33 and radially outside the mounting section 116. The radial spring section 119 is formed by a cranked section 120 between the mounting section 116 and the radially outer section of the anti-rattle component 30, as can be seen in particular in FIG. 27. The radial spring action of the radial spring section 119 is also assisted in the embodiment of FIGS. 25 to 27 in that, in the region of the cranked section 120, the anti-rattle component 30 is formed with a multiplicity of circumferentially spaced-apart weakening regions 122, which in the present case are formed as axial recesses. The axial recesses may be formed as axial depressions or as continuous axial recesses, as can be seen at 122 in FIG. 27.

The weakening region 122 may however also be formed by manipulating the material or by means of other manipulation of the shaping in the region of the cranked section 120.

The cranked shape of the anti-rattle component has the effect that a frictional engagement 38 can be produced between the anti-rattle component 30 and the second component 14 firstly at those axial end sides which face towards one another, as illustrated in FIG. 27. Such a frictional engagement 38 may however also be produced in the region of the engagement of the mounting section 116 into the radial groove 118 of the annular projection 42, as is likewise illustrated in FIG. 27.

FIG. 28 shows a modification of the component pairing 10 shown in FIGS. 25 to 27, with the mounting section 116 being formed, at its radially inner side, with a radial groove 124. The width of the radial groove 118 in the annular projection 42 and the width of the mounting section 116 in the region of the radial groove 124 are matched to one another in such a way that the mounting section 116 is braced in the axial direction in the radial groove 118. The remaining annular webs press outwards in the axial direction, such that a frictional engagement 38 is formed between the anti-rattle component 30 and the second component 14 on axial side walls of the radial groove 118.

FIG. 29 shows a further modification of the component pairing 10 of FIGS. 25 to 27. In said embodiment, the mounting section 116 is provided with a friction lining 126, which may for example be formed on the radial inner circumference of the mounting section 116. The friction lining 126 may assist the frictional engagement between the anti-rattle component 30 and the second component 14, in particular increase the friction force.

FIG. 30 illustrates a further modification of the component pairing 10 of FIGS. 25 to 27.

In the component pairing 10 of FIG. 30, the weakening region 122 is formed not by axial recesses like in the preceding embodiments. The weakening region 122 is in fact formed by virtue of the anti-rattle component 30 being formed with a smaller material thickness in the region of the cranked section 120.

Figure 31:
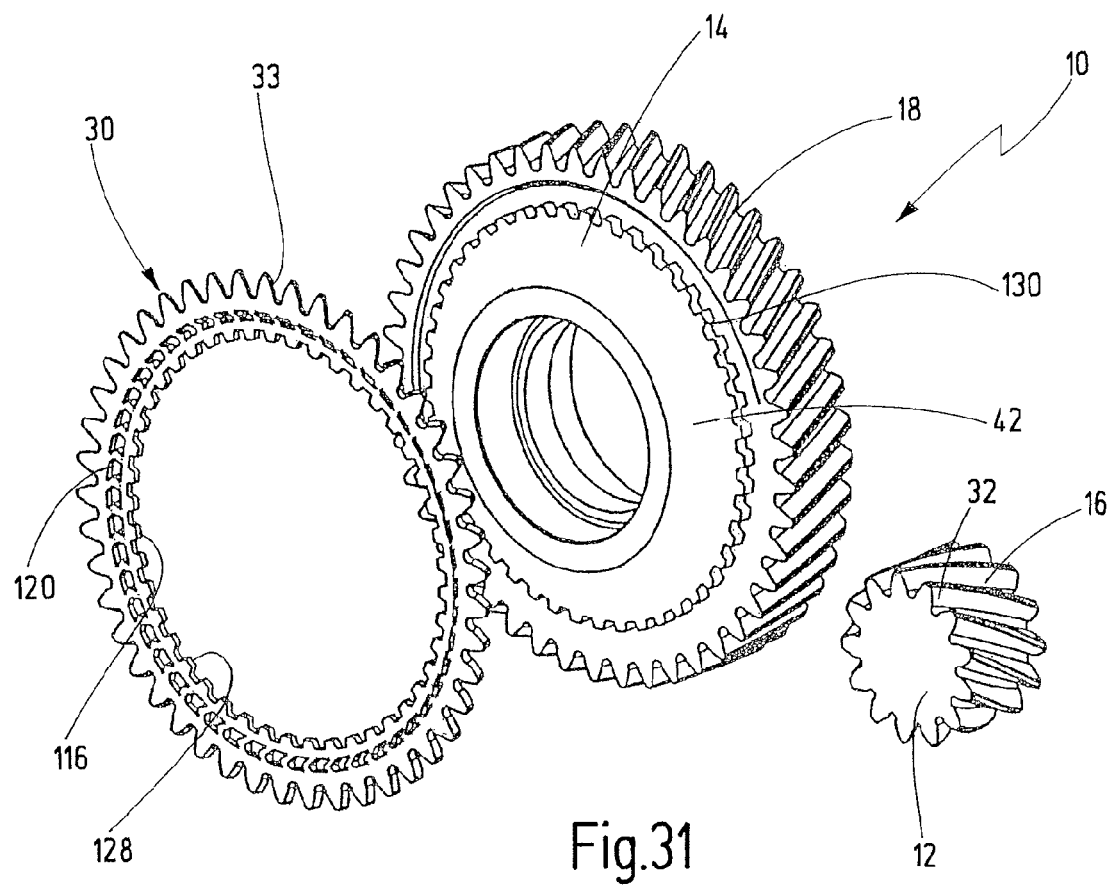
FIG. 31 shows an exploded view of a component pairing according to a further embodiment of the invention.
Figure 32:
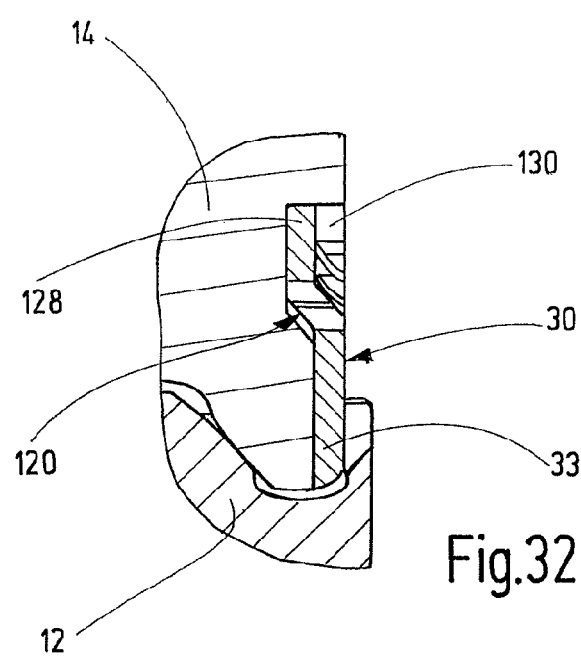
FIG. 32 shows a detail view of a longitudinal section through the component pairing of FIG. 31.

FIGS. 31 and 32 show a further embodiment of a component pairing 10, which generally corresponds in terms of design and function to the component pairing of FIGS. 25 to 27.

In the component pairing 10 of FIGS. 31 and 32, instead of a frictional engagement 38 between the anti-rattle component 30 and the second component 14, it is provided that the anti-rattle component 30 and the second component 14 are connected to one another in a positively locking manner in the drive direction. For this purpose, a positive locking section 128 (for example in the manner of a keyway toothing) is formed on the inner circumference of the anti-rattle component 30. A positive locking section 130 is correspondingly formed on the outer circumference of the annular projection 42, onto which positive locking section 130 the anti-rattle component 30 can be pushed.

Said embodiment may suffice in particular if the frictional engagement 38 between the anti-rattle component 30 and the second component 14 is not sufficient to ensure a frictional engagement in the steady state (such that, in the steady state, the anti-rattle component 30 is driven concomitantly in the drive direction by the second component 14 without a loss in efficiency).

Figure 33:
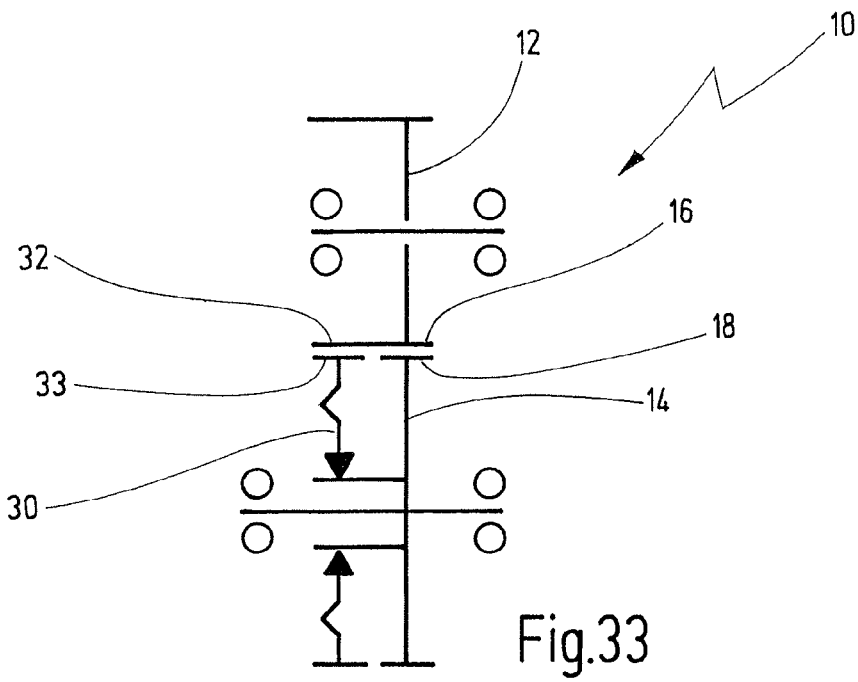
FIG. 33 shows a schematic illustration of a further embodiment of a component pairing according to the invention.

FIG. 33 schematically shows a further component pairing 10 which corresponds in terms of design and mode of operation to one of the embodiments of FIGS. 21 to 32.

In said embodiment, as is the case in some of the other embodiments described above, only one further component, specifically the anti-rattle component 30, is provided in addition to the two components 12, 14 in order to realize the anti-rattle function.

Said anti-rattle component 30 is provided in a plane parallel to the second component 14 and performs preferably at least one, but in particular all of the following functions:
- play compensation with respect to the counterpart gearwheel 12 is provided,
- a radial elasticity and/or tangential elasticity (that is to say in the drive direction) is realized,
- axial fixing is realized, and
- in the steady state, frictional engagement (or if appropriate positive locking) is realized between the anti-rattle component 30 and the second component 14.

Figure 34:
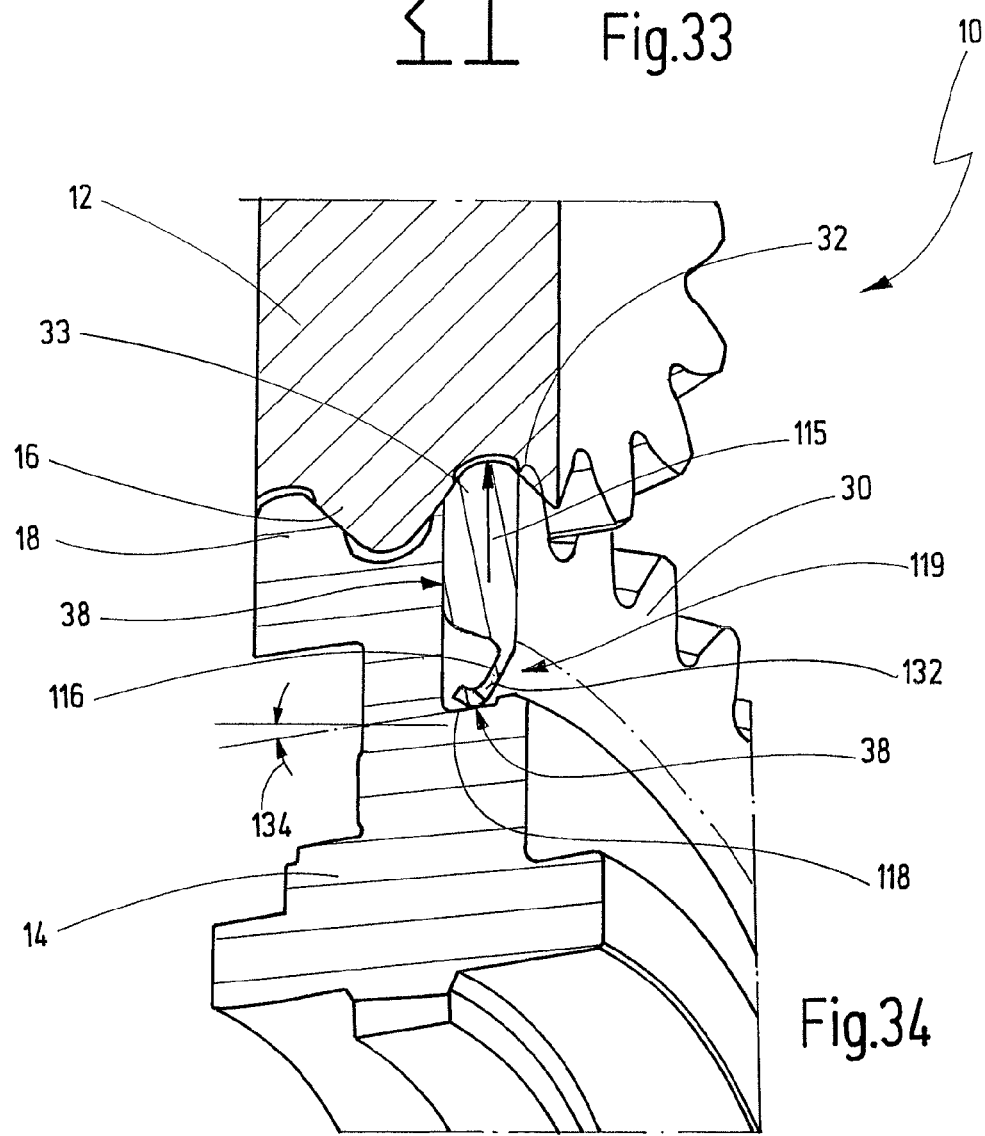
FIG. 34 shows a longitudinal section through a further embodiment of a component pairing according to the invention.

FIG. 34 shows a further embodiment of a component pairing 10 which generally corresponds in terms of design and function to the embodiments 21 and 30 to 33 described above. Only differences are explained below:

The anti-rattle component 30 has a radially outer annular section, on the outer circumference of which is formed the anti-rattle toothing 33 which engages with the anti-rattle toothing 32 of the first component 12. A curved section 132 is formed on the radially inner section of the anti-rattle component 30, which curved section 132 has a smaller material thickness than the radially outer section. The curved section 132 extends towards the second component 14 from that axial side of the anti-rattle component 30 which faces away from the second component 14, and comprises a section which bears against a radially outer surface of the radial groove 118. The radially outer surface of the radial groove 118 is inclined with respect to the longitudinal direction, as shown at 134, specifically in the radially inward direction, such that an axial force is exerted on the anti-rattle component 30 by the frictional engagement 38 between the curved section 132 and the radial groove 118. In this way, an axial side, which faces towards the second component 12, of the anti-rattle component 30 comes into frictional engagement 38 with a corresponding surface of the second component 14.

The curved section 132 also forms a radial spring section 119, such that the anti-rattle toothing 33 is pressed with a radial force 115 into the anti-rattle toothing 32 of the first component 12.

Furthermore, a frictional engagement 38 may also be produced between the curved section 132 and the radial groove 118, as shown in FIG. 34.

Figure 35:
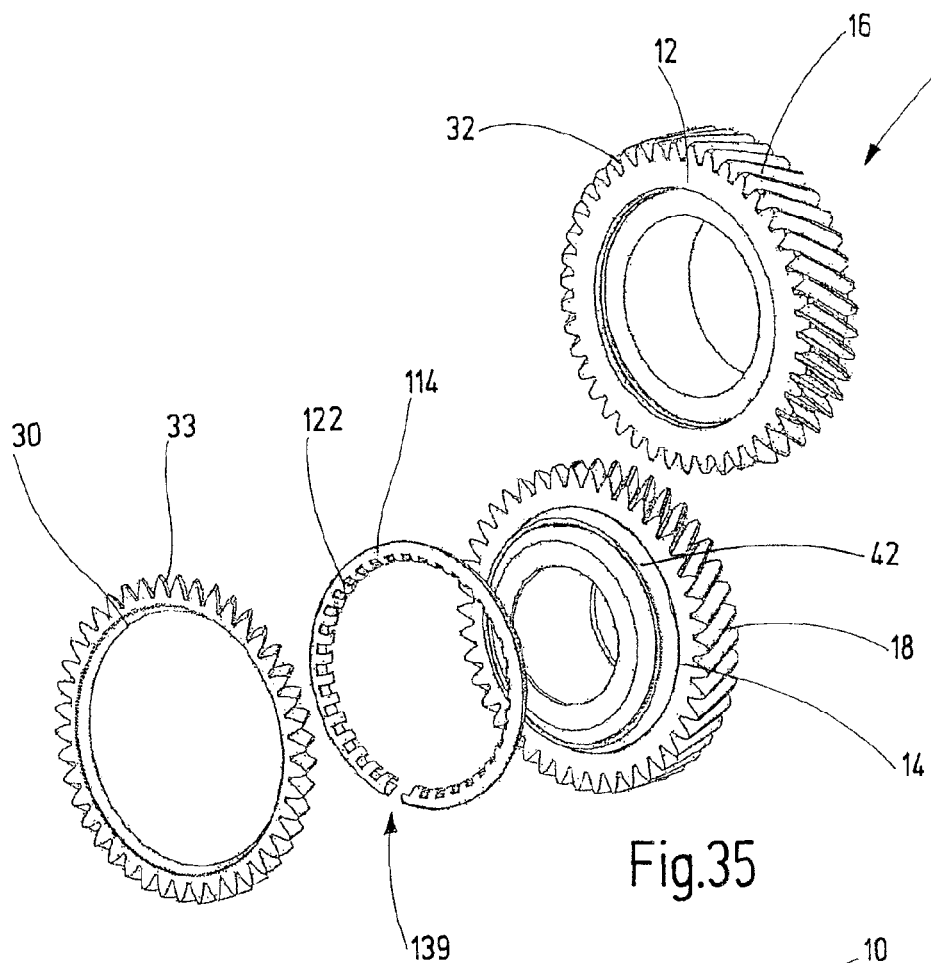
FIG. 35 shows an exploded view of a component pairing according to a further embodiment of the invention.
Figure 36:
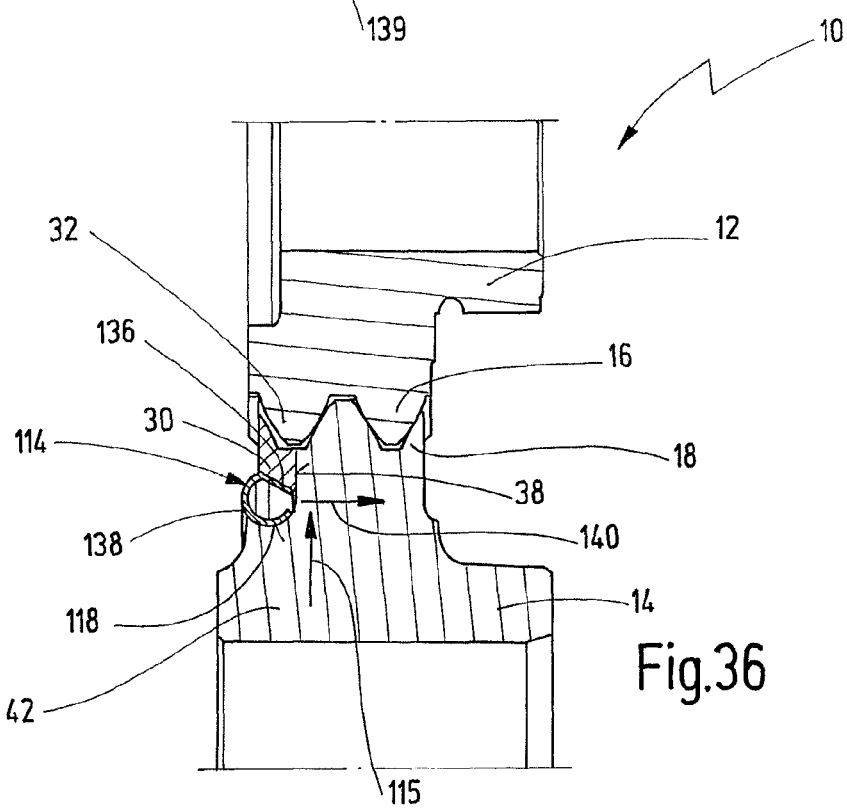
FIG. 36 shows a longitudinal section through the component pairing of FIG. 35.

FIGS. 35 and 36 show a further embodiment of a component pairing 10 which generally corresponds in terms of design and function to the embodiments of FIGS. 21 to 24 described above. Only differences in relation thereto are explained below.

The component pairing 10 has a radial spring element 114 in the form of an annular spring element which is open at one point and which is produced in particular from a metal such as a spring steel.

The annular spring element 114 is arranged between the radially outer circumference of an annular projection 42 of the second component 14 and the inner circumference of the anti-rattle component 30.

The radial spring element 114 has an oblique section 136 which bears against a corresponding oblique surface on the inner circumference of the anti-rattle component 30. Integrally formed on that side of the oblique section 136 which faces away from the second component 14 is a curved section 138 which, substantially following a circular shape, extends through 90° to 270°, in particular in the region of 180°, back to the second component 14. The curved section 138 consequently has a semi-toroidal shape at its radially inner side. With said rounded shape, the inner circumference of the radial spring element 114 lies in a correspondingly concavely shaped radial groove 118 of the annular projection 42.

As shown in FIG. 35, the curved section 138 may be formed with a multiplicity of recesses which are distributed over the circumference and which form a weakening region 122.

The radial spring element 114 has an approximately annular structure which is preferably discontinuous, as shown in FIG. 35 at 139.

In the assembled state (see FIG. 36), the curved section 138 lies in the concavely shaped radial groove 118, such that the radial spring element 114 is fixed in the axial direction. The oblique section 136 bears against the inner circumference of the anti-rattle component 30. Here, the oblique section 136 extends obliquely radially inwards, such that the anti-rattle component 30 is fixed axially to the second component 14 indirectly via the radial spring element 114.

Furthermore, the radial spring element 114 exerts a radial force 115 on the anti-rattle component 30, with the advantages described above. On account of the oblique section 136, the radial spring element 114 also exerts an axial force 140 on the anti-rattle component 30, in order to increase the frictional engagement 138 between the anti-rattle component 30 and the second component 14.

As described above, the radial spring element 114 has a hollow toroidal shape with a discontinuity 139, with a radially outer side of the hollow toroidal shape being formed with the oblique section 136.

Figures 37, 38:
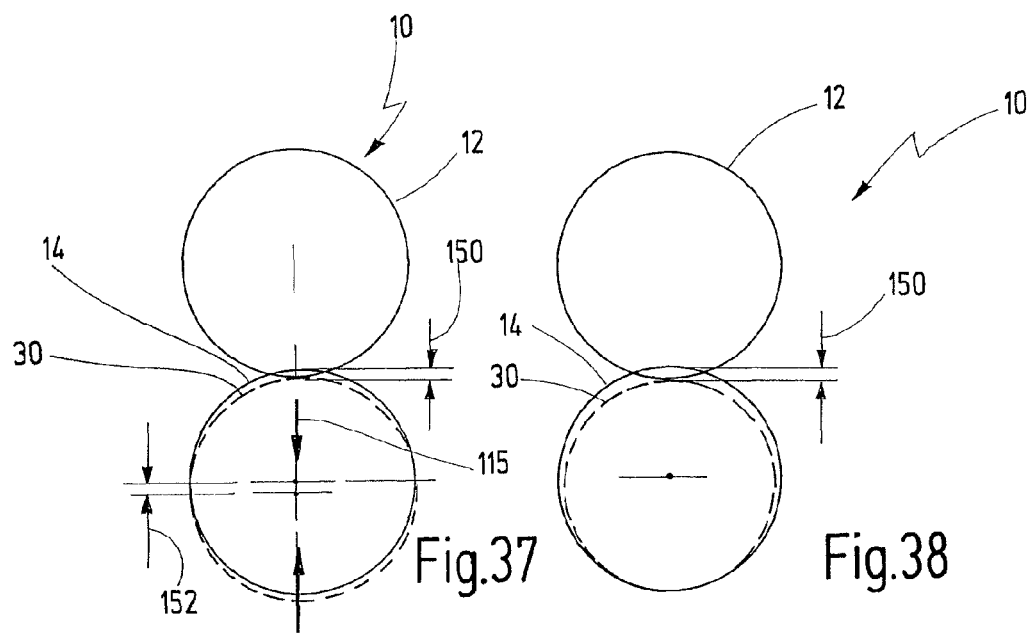
FIG. 37 shows a schematic illustration of a component pairing according to the invention.
FIG. 38 shows a view, corresponding to FIG. 37, of a further embodiment of a component pairing according to the invention.

FIGS. 37 and 38 schematically show component pairings in which the anti-rattle component 30 can be deflected elastically in the radial direction 115. Here, FIG. 37 shows an embodiment in which the anti-rattle component 30 is of rigid overall design and is mounted in a radially elastic fashion. Here, for example on account of a greater tooth thickness (see below), the anti-rattle component 30 is pushed out of the anti-rattle toothing 32 of the first component in the radial direction 115. This results in a radial offset 150 between the toothings in the region of the toothed engagement.

Since the anti-rattle component 30 is of substantially rigid design, it is eccentrically offset in relation to the second component 40 overall, such that the central points thereof are also radially offset, as shown at 152.

FIG. 38 shows an alternative embodiment in which the anti-rattle component 30 is itself for example of elastic design. This again results in a radial offset 150 in the region of the toothed engagement, whereas such a radial offset need not be provided on the radially opposite side.

Figure 39:
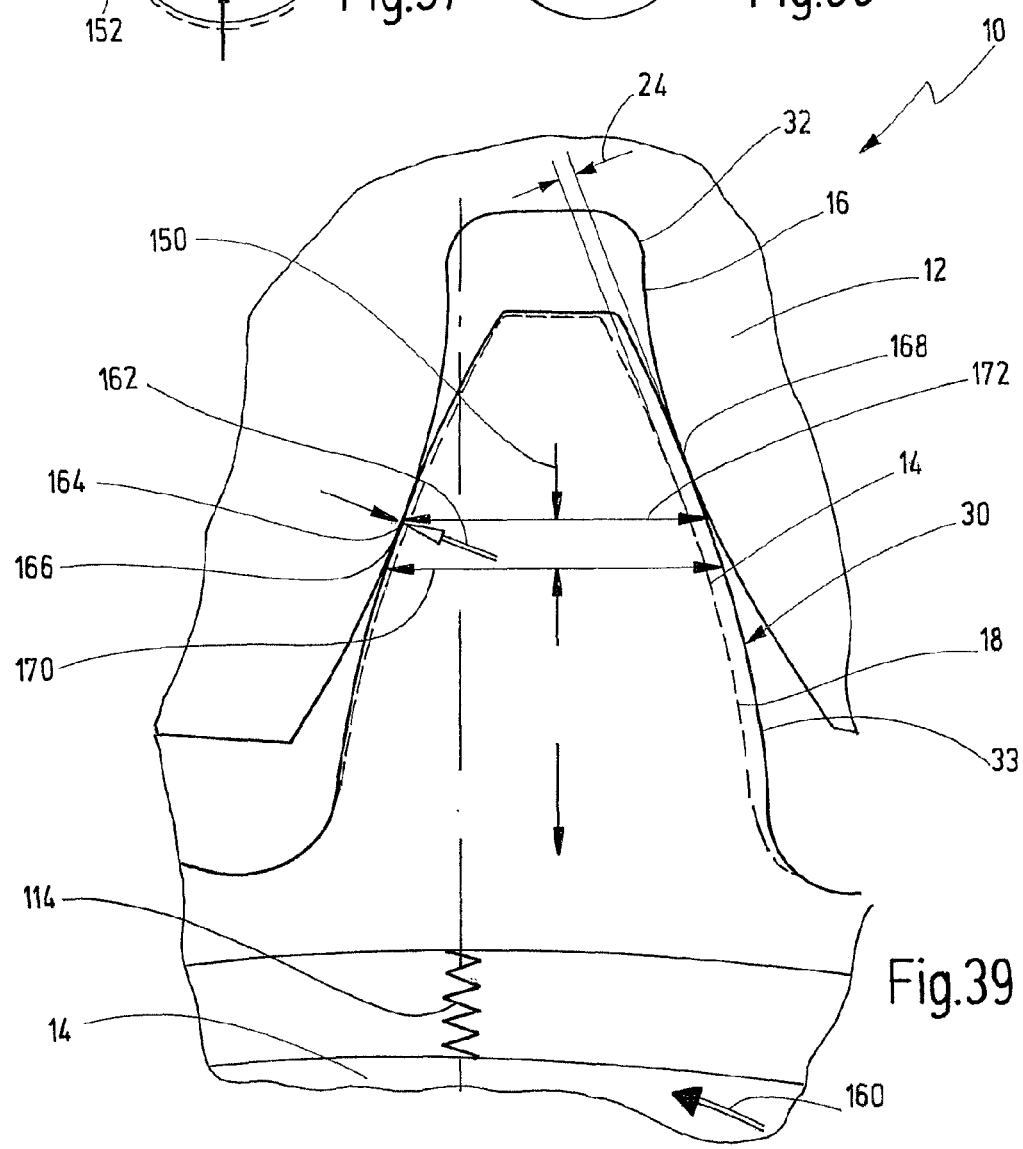
FIG. 39 shows a schematic illustration of a toothed engagement of a component pairing according to the invention.

FIG. 39 schematically shows a preferred embodiment of a component pairing 10. Here, the second anti-rattle component 14 is for example driven in the drive direction with a drive force 160. Here, a flank of the second component toothing 18 bears against a flank of the first component toothing 16. There, a drive force 162 is transmitted to the first component 12. This takes place at a location 164 of the toothed engagement between the toothings 16, 18. FIG. 38 also shows the tooth flank play 24 between the toothings 16, 18.

The anti-rattle toothing 33 of the anti-rattle component 30 is in contrast designed such that it is in two-flank rolling engagement with the first anti-rattle toothing 32 of the first component 12. Here, a toothed engagement takes place between said toothings firstly at a location 166, which may for example coincide with the location 164. Secondly, the toothings 33, 32 also make contact at an opposite flank, as shown at 168.

The teeth of the second anti-rattle toothing 32 are designed so as to have a tooth thickness 170 which is greater than a tooth space 172 of the first anti-rattle toothing 32. This results in the tooth being pushed out of the first anti-rattle toothing 32 in the radial direction 115 by means of the toothed engagements 166, 168, specifically counter to the force of a schematically illustrated radial spring element. The radial deflection caused by this is in turn illustrated in FIG. 38 at 150. With regard to FIG. 38, it should be noted that the difference between the tooth thickness 170 and the tooth space 172 is illustrated on an exaggeratedly large scale in order to illustrate the situation more clearly. Accordingly, the radial offset 150 is also illustrated in exaggerated fashion. Said radial offset is generally less than 500 μm.

The anti-rattle toothings 32, 33 are designed as involute toothings. Here, the expressions tooth thickness and the tooth space relate, according to the conventional nomenclature, to the tooth thickness in the so-called pitch circle.

Figure 40:
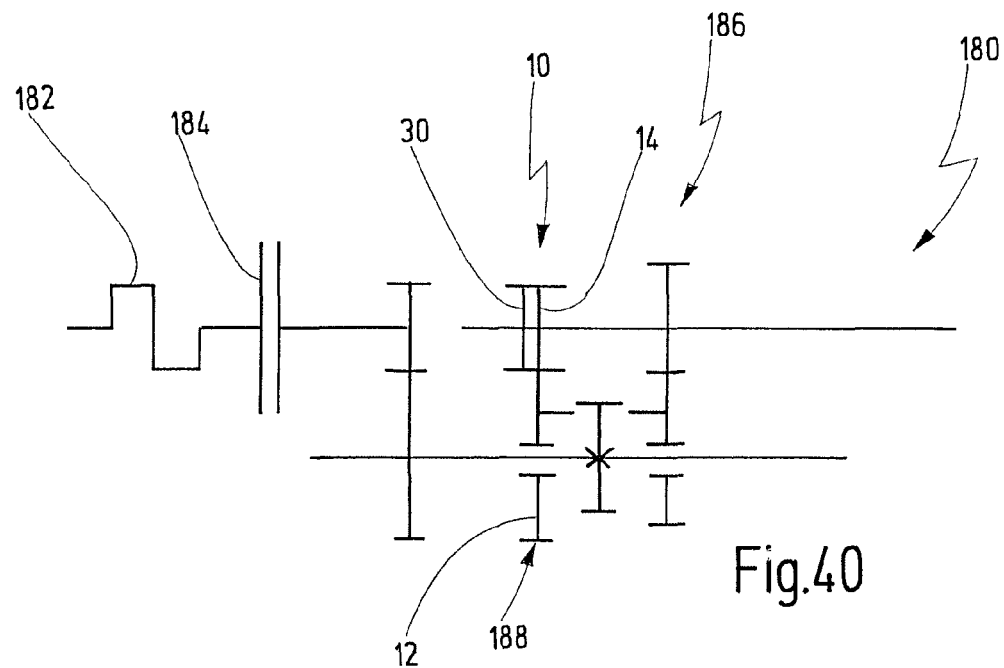
FIG. 40 shows a schematic illustration of a first drivetrain for a motor vehicle.
Figure 41:
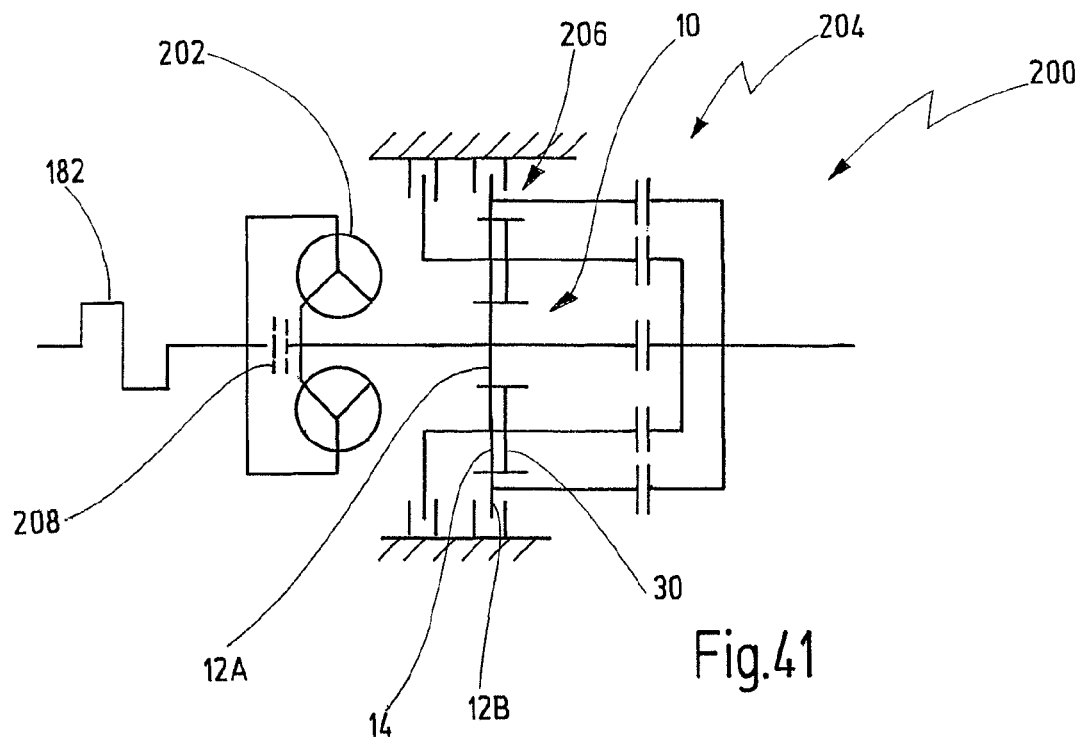
FIG. 41 shows a schematic illustration of a further drivetrain for a motor vehicle.

FIGS. 40 and 41 show exemplary drivetrains for motor vehicles in which the component pairing according to the invention can be used.

FIG. 40 schematically shows a drivetrain 180 for a motor vehicle, which has an internal combustion engine 182 and a starting clutch 184. The drivetrain 180 also comprises a countershaft-type multi-stage gearbox 186 which comprises a multiplicity of wheel sets 188 in the usual way. The wheel sets 188 can be shifted by means of shift clutches (synchronous clutches) in order to engage and disengage different gear stages of the multi-stage gearbox 186. The wheel sets 188 generally comprise one constant wheel set and a multiplicity of wheel sets which comprise in each case one loose wheel and one or more fixed wheels.

FIG. 40 also illustrates by way of example that at least one of the wheel sets 188 has a component pairing 10 according to the present invention. The wheel set 188 comprises a first component 12 in the form of a loose wheel which can be shifted by means of a synchronous clutch, and a second component 14 in the form of a fixed wheel. Here, the fixed wheel 14 is assigned an anti-rattle component 30 of the type according to the invention.

FIG. 41 shows an alternative embodiment of a drivetrain 200 for a motor vehicle, which comprises a drive engine 182, a hydrodynamic converter 202 and a planetary gear set 204. The planetary gear set 204 comprises at least one planet gear set 206 which can be shifted by means of clutches or brakes which are not shown in any more detail. Here, for example, the planet gears of the planet gear set 206 form second components 14 within the context of a component pairing according to the invention. The sun gear is designed as a first component 12A, and the ring gear is likewise designed as a first component 12B. The planet gears (the second components) 14 are in engagement both with the sun gear 12A and also with the ring gear 12B. Here, at least one of the planet gears 14 may be assigned an anti-rattle component 30 according to the present invention.

In the drivetrain 180 of FIG. 40, it is advantageous that the drivetrain need not comprise a dual-mass flywheel between the drive engine 112 and the clutch 184. However, the clutch 184 itself may be equipped with a torsional damper of conventional design, which may comprise a two-stage or multi-stage characteristic curve.

In the drivetrain 200, it is advantageous that a lock-up clutch 208 for bypassing the hydrodynamic converter 202 can be activated more frequently or earlier such that the efficiency of the drivetrain 200 can be increased.

The embodiments of component pairings described above have at least one of the following advantages:

The rattling problem in a play-afflicted component pairing is solved by means of only one component in one plane.

Play compensation is provided either by means of a profile displacement, by means of thicker teeth of the anti-rattle toothing 33 of the anti-rattle component 30, by means of a smaller tooth space of the anti-rattle toothing 32, by virtue of the anti-rattle component 30 being pressed radially into the anti-rattle component 32 of the first component, by means of an increase in the volume of the anti-rattle component until play compensation is provided ("tight mesh"), by means of elastic suspension by means of spring regions which are integrated into the anti-rattle component 30, for example in the radial direction and/or tangential direction (that is to say in the drive direction), by means of frictional engagement of the anti-rattle component 30 in the axial or radial direction with the second component 14, wherein the frictional engagement may take place directly or indirectly, and/or by means of axial or radial fixing of the anti-rattle component 30 to the second component 14.

The anti-rattle component 30 may be assigned a complementary anti-rattle component, specifically by means of a positively locking or non-positively locking connection. The complementary anti-rattle component may for example be composed of a different material than the anti-rattle component. The complementary anti-rattle component 90 may for example be formed from plastic (for example polyimide), whereas the anti-rattle component 30 itself is produced from metal. In this way, the use of metal (steel) can be minimized in order to reduce costs and weight.

If metal is used for the anti-rattle component, it is also conceivable for aluminium (or some other light metal) to be used instead of steel. In the embodiment of FIGS. 9 and 10, the anti-rattle component 30 is formed preferably from plastic or a light metal, because a desired compensation of thermal expansion is possible in this way.

In a gearbox having a plurality of wheel sets, an anti-rattle measure as above is formed preferably on at least one, preferably on each of the wheel sets. Here, it is preferable for the drivetrain in which the gearbox is used to have no dual-mass flywheel at the output side of the internal combustion engine. For this situation, it is preferable if not only the wheel sets are formed with an anti-rattle measure, as described above, but rather if rattling vibrations of the synchronizing rings in the gearbox can also be reduced, for example by clipping corrugated springs between the clutch body and synchronizing ring.

In addition to the use in wheel sets of gearboxes, the following applications are also generally conceivable: engine timing wheels, industrial transmissions, pumps, gearwheel pumps, machine tools, household appliances, life science products such as electric toothbrushes, kitchen appliances. The use in gearboxes is not restricted to use in passenger motor vehicles, but rather to the use in gearboxes for utility vehicles.

With regard to the dimensioning of the component pairings according to the invention, the following should also be noted. In every application, the dimensions or geometries should be precisely determined according to the required physical operating principles in each case on an individual basis by means of suitable calculations and—if such calculations are not adequately known or in existence—by means of empirical test calibration, in such a way that the required function of the functional carrier/components is achieved fully and as desired—as described above—in every conceivable functional situation.

The stated numerical vales apply in particular to a manual gearbox of a passenger motor vehicle with a swept volume of 1.6 liters and a maximum transmissible torque of 217 Nm. Here, the main axis spacing between the drive shaft and auxiliary shaft is 72 mm. Any other configuration of the component pairing must be newly determined on an individual basis. Here, the parameters of rotational speed, amplitude of the angular acceleration and mass moments of inertia influence the stated forces and spring stiffnesses of the component pairing approximately linearly in a rational ratio. In simple terms, therefore: double the rotational speed or double the amplitude of the angular acceleration or double the mass moment of inertia of the loose part which must prevented from clattering and rattling by the component pairing must be achieved with a doubling of the spring forces and stiffnesses. Conversely, the same also applies for a halving of the stated parameters. For the tooth thickness widening of the micro-gearwheel, it is the case (at least in the second aspect of the invention), generally irrespectively of the structural size and structural form of the gearbox: the tooth thickness of the micro-gearwheel must always be greater than the respective tooth space of the counterpart wheel arising as a result of production fluctuations, thermal expansion or mechanical deformation, in order that it is always reliably ensured that any rotational flank play with respect to the counterpart wheel is eliminated by 100% by means of the two-flank rolling pairing of the micro-gearwheel.

What is claimed is:

1. Component pairing comprising a first component with a first component toothing and comprising a second component with a second component toothing which is in engagement with the first component toothing in order to be able to transmit a drive force in a drive direction via the component toothings, with the first component also being assigned a first anti-rattle toothing, with an anti-rattle component being fastened to the second component, which anti-rattle component has a second anti-rattle toothing which is in engagement with the first anti-rattle toothing, wherein the anti-rattle component is mounted so as to be displaceable relative to the second component in the drive direction and so as to be rotatable with respect to the second component, and with the second component and the anti-rattle component being assigned in each case one friction section, which friction sections are in frictional engagement with one another through an axial pressure force, with the second component and the anti-rattle component being braced elastically against one another in order to press the friction sections against one another at least at a location adjacent to an engagement point of the first anti-rattle toothing and second anti-rattle toothing, the frictional engagement configured to dampen the rotation of the second component, and wherein the number of teeth of the first and second component toothings and of the respectively assigned anti-rattle toothings are identical.

2. Component pairing according to claim 1, with the tooth flank play between the anti-rattle toothings being smaller than the tooth flank play between the component toothings.

3. Component pairing according to claim 1, with the friction sections being aligned radially.

4. Component pairing according to claim 3, with the friction sections being formed in the region of lateral end faces of the second component or of the anti-rattle component.

5. Component pairing according to claim 1, with the second component and the anti-rattle component being braced elastically against one another in order in an axial direction.

6. Component pairing according to claim 1, wherein a two-flank rolling contact is established between the anti-rattle toothings.

7. Component pairing according to claim 1, wherein the tooth pitches of the component toothings are identical with the tooth pitches of the respective assigned anti-rattle toothings.

8. Component pairing comprising a first component with a first component toothing and comprising a second component with a second component toothing which is in engagement with the first component toothing in order to be able to transmit a drive force in a drive direction via the component toothings, with the first component also being assigned a first anti-rattle toothing, with an anti-rattle component being fastened to the second component, which anti-rattle component has a second anti-rattle toothing which is in engagement with the first anti-rattle toothing, wherein the anti-rattle component is mounted so as to be displaceable relative to the second component in the drive direction and so as to be rotatable with respect to the second component, and with the second component and the anti-rattle component being assigned in each case one friction section, which friction sections are in frictional engagement with one another along respective annular surfaces that encircle an axis of rotation of the second component through an axial pressure force, with the second component and the anti-rattle component being braced elastically against one another in order to press the friction sections against one another, the frictional engagement configured to dampen the rotation of the second component, and wherein the number of teeth of the first and second component toothings and of the respectively assigned anti-rattle toothings are identical.

* * * * *

UNITED STATES PATENT AND TRADEMARK OFFICE
CERTIFICATE OF CORRECTION

PATENT NO.       : 8,695,449 B2                                      Page 1 of 1
APPLICATION NO.  : 12/824100
DATED            : April 15, 2014
INVENTOR(S)      : Claus-Hermann Lang It is certified that error appears in the above-identified patent and that said Letters Patent is hereby corrected as shown below:

Title page, (item 73, Assignee) line 2, Change "Zhanradfabrik" to --Zahnradfabrik--.

In the Specification

Column 2 line 22, Change "DE 10 2004 00 A1" to --DE 10 2004 008 171 A1--.

Signed and Sealed this
Thirtieth Day of December, 2014

Michelle K. Lee
*Deputy Director of the United States Patent and Trademark Office*